US012608236B2

(12) United States Patent
Wilson et al.

(10) Patent No.: US 12,608,236 B2
(45) Date of Patent: Apr. 21, 2026

(54) MANAGING USE OF HARDWARE BUNDLES AND CHANGES IN SUBSCRIPTIONS

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 417 days.

(21) Appl. No.: 18/455,841

(22) Filed: Aug. 25, 2023

(65) Prior Publication Data

US 2025/0068478 A1     Feb. 27, 2025

(51) Int. Cl.
*G06F 9/50*          (2006.01)
(52) U.S. Cl.
CPC .......... *G06F 9/5044* (2013.01); *G06F 9/5088* (2013.01)
(58) Field of Classification Search
CPC ............................ G06F 9/5044; G06F 9/5088
USPC ......................................................... 718/104
See application file for complete search history.

(56) References Cited

U.S. PATENT DOCUMENTS

| | | | | |
|---|---|---|---|---|
| 7,043,647 B2 * | 5/2006 | Hansen | ..................... | G06F 1/26 |
| | | | | 713/340 |
| 7,457,976 B2 * | 11/2008 | Bolan | ..................... | G06F 1/263 |
| | | | | 713/340 |
| 8,443,370 B2 * | 5/2013 | Smith | ..................... | G06F 9/50 |
| | | | | 718/1 |
| 8,578,076 B2 * | 11/2013 | van der Linden | ...... | H04L 47/70 |
| | | | | 709/227 |
| 8,606,667 B2 * | 12/2013 | Ferris | ..................... | H04L 47/72 |
| | | | | 718/1 |
| 9,173,090 B2 * | 10/2015 | Tuchman | ............... | G06Q 20/20 |
| 10,496,306 B1 * | 12/2019 | Srivastava | ............ | G06F 3/0631 |
| 10,817,398 B2 | 10/2020 | Cencini et al. | | |
| 10,931,550 B2 | 2/2021 | Kumar et al. | | |
| 11,023,148 B2 * | 6/2021 | Srivastava | ............ | G06F 3/0604 |
| 11,272,267 B2 | 3/2022 | Herdrich et al. | | |
| 11,321,129 B2 * | 5/2022 | Shimada | ............... | G06F 9/5061 |
| 11,429,669 B2 | 8/2022 | Renjith | | |
| 11,460,910 B2 * | 10/2022 | Woolcock | ............ | G06F 1/3206 |

(Continued)

OTHER PUBLICATIONS

"Monitoring for DPU capacity planning," Amazon Web Services, Web Page <https://docs.aws.amazon.com/glue/latest/dg/monitor-debug-capacity.html> accessed on Sep. 6, 2022 (7 Pages).

*Primary Examiner* — Alicia Baturay
(74) *Attorney, Agent, or Firm* — WOMBLE BOND DICKINSON (US) LLP

(57)          ABSTRACT

Methods, systems, and devices for providing for providing computer implemented services using managed systems are disclosed. To provide the computer implemented services, hardware components may be bundled into hardware bundles. The hardware bundles may be used to satisfy subscriptions for the services, and limit use of the hardware bundles when subscription limits are reached. The hardware bundles may include direct management hardware components and indirect management hardware components. Limits on use of the hardware bundles may be enforced by analyzing workloads performed by the hardware bundles. Proactive action may be performed to reduce the likelihood of the limits being reached.

20 Claims, 17 Drawing Sheets

(56) References Cited

U.S. PATENT DOCUMENTS

| | | | |
|---|---|---|---|
| 11,558,381 | B2 | 1/2023 | Avetisov et al. |
| 11,995,058 | B2 * | 5/2024 | Ritter .................. H03M 7/6017 |
| 12,277,426 | B2 * | 4/2025 | Wilson ................ G06F 9/44505 |
| 2003/0065958 | A1 | 4/2003 | Hansen |
| 2007/0118771 | A1 | 5/2007 | Bolan |
| 2010/0058347 | A1 | 3/2010 | Smith |
| 2011/0022812 | A1 | 1/2011 | van der Linden |
| 2013/0073403 | A1 | 3/2013 | Tuchman |
| 2016/0150400 | A1 | 5/2016 | Cha |
| 2022/0075657 | A1 | 3/2022 | Shimada |
| 2022/0121267 | A1 | 4/2022 | Woolcock |
| 2022/0321728 | A1 | 10/2022 | Minamiyama |
| 2024/0273524 | A1 * | 8/2024 | Fang .................... G06Q 20/065 |
| 2025/0068219 | A1 * | 2/2025 | Wilson ...................... G06F 1/26 |
| 2025/0068436 | A1 | 2/2025 | Wilson |
| 2025/0068470 | A1 * | 2/2025 | Wilson ................. G06F 9/5027 |
| 2025/0068476 | A1 * | 2/2025 | Wilson ................. G06F 9/5044 |
| 2025/0068477 | A1 * | 2/2025 | Wilson ................. G06F 9/5005 |
| 2025/0068478 | A1 | 2/2025 | Wilson |
| 2025/0068479 | A1 * | 2/2025 | Wilson ................... G06F 9/505 |
| 2025/0068480 | A1 * | 2/2025 | Wilson ................. G06F 9/5061 |
| 2025/0068541 | A1 * | 2/2025 | Wilson .............. G06F 11/3495 |
| 2025/0069171 | A1 * | 2/2025 | Wilson .............. G06Q 50/184 |

* cited by examiner

MANAGING USE OF HARDWARE BUNDLES AND CHANGES IN SUBSCRIPTIONS

FIELD DISCLOSED HEREIN

Embodiments disclosed herein relate generally to system management. More particularly, embodiments disclosed herein relate to systems and methods to manage use of bundled hardware resources of a system.

BACKGROUND

Computing devices may provide various services. For example, computing devices may host applications that store data, process data, and generate data thereby providing services. Depending on the type of processing performed, different hardware and software components available for use in the type of processing may be used to provide the processing.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
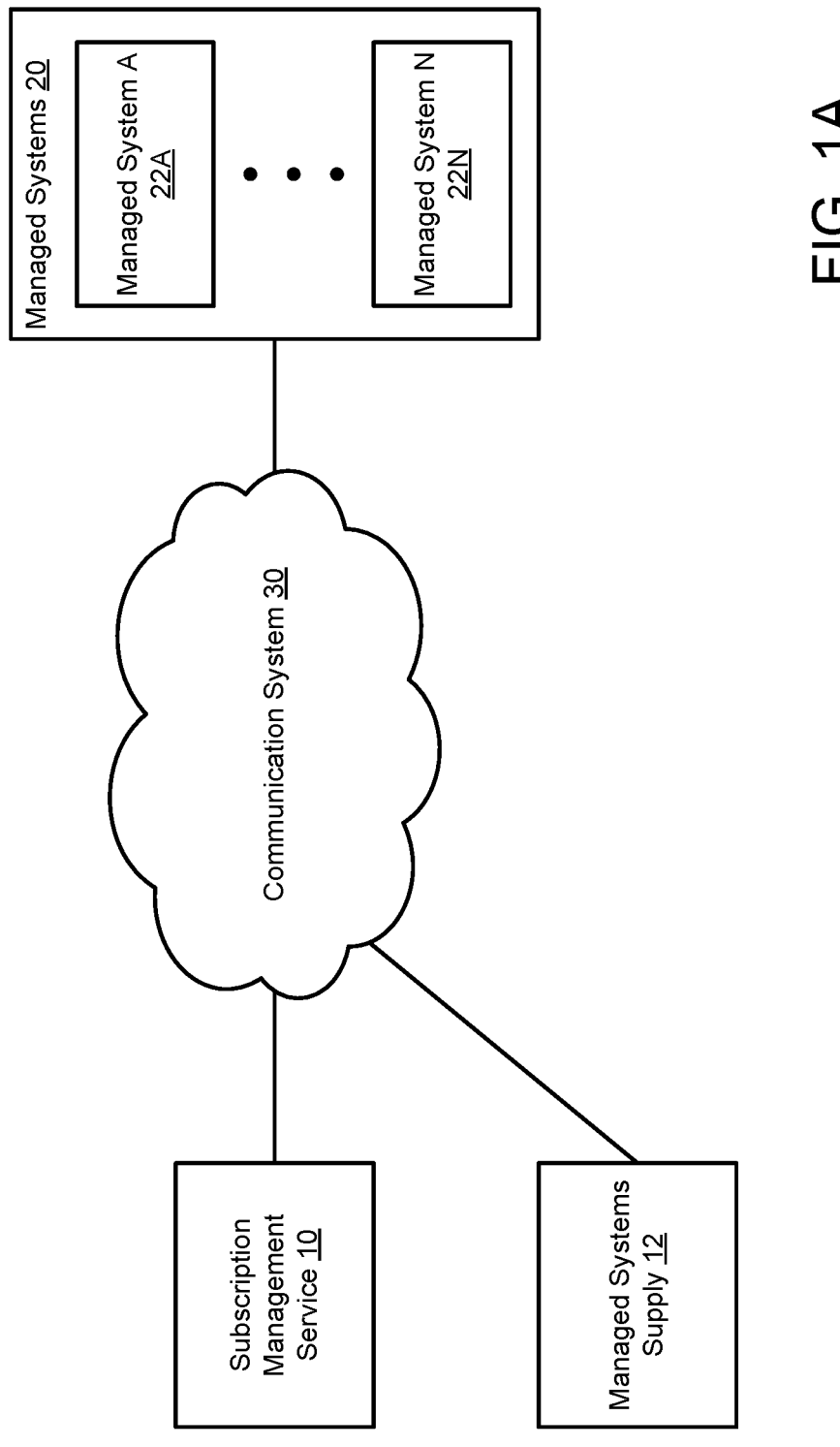
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources and also software resources such as drivers, firmware, etc. to provide the desired computer implemented services. Different computer implemented services may have different hardware and/or software resources needs. An aggregation of different types of computer implemented services may need to be provided so that corresponding solutions may be provided.

To improve the likelihood of the computer implemented services being provided, embodiments disclosed here relate to methods and systems for managing managed systems using a subscription based model. The subscription model may utilize a highly accessible service to obtain information regarding capabilities (e.g., hardware resources) of managed systems to present information regarding all potential solutions that the managed systems may provide.

By presenting users with such information, the users may not need to be well versed in the underlying hardware and software components necessary for the solutions to be provided.

Once a user selects which services to be provided, various subscriptions may be established and forwarded to managed systems for implementation. To implement the subscriptions, the managed system may selectively enable various hardware to host software.

To manage the hardware, some hardware may be bundled for manageability. The hardware may be bundled based on the ability for the bundled hardware to be managed at the bundle level, as well as other factors.

When selected for use in supporting a subscription, the operation of directly manageable hardware components of the hardware bundle may be updated to modify the overall operation of the hardware bundle. The updated operation may facilitate selective use of the functionality of the hardware bundle to enable the subscribed to services to be provided to the users of the managed system.

To ascertain when limits on subscriptions have been reached, the workloads performed by the hardware bundles may be analyzed to discriminate those workloads performed to service corresponding subscriptions from those performed for other subscriptions and/or other purposes. The analysis may be performed by analyzing the operation of both hardware resources of the hardware bundles and other hardware resources tasked with servicing subscriptions.

When subscriptions are updated, membership of hardware bundles may be updated. To update the membership of the hardware bundles, workloads governed by subscriptions that have been modified may be temporarily migrated away from the hardware bundles to unencumber the hardware bundles (e.g., reduce an impact of the operation of the hardware bundles on compliance with subscriptions). While unencumbered (e.g., having a sufficiently low impact on compliance with subscriptions, may be a set by a threshold level of impact, etc.), the membership in the hardware bundles may be changed which may impact the ability of the hardware bundle to provide various services. However, while being unencumbered, the impact may be sufficiently low for the services governed by the subscription to still meet subscription requirements. Once membership in the bundle is changed, the workloads may be migrated back to the now-updated hardware bundle.

By doing so, managed systems may be deployed with additional resources from those necessary to provide desired services at a time of deployment. Overtime, various resources may be selectively enabled for use, in accordance with various subscriptions that may be entered into by users of the managed system.

In an embodiment, a method for managing computer implemented services provided by a managed system is disclosed. The method may include enabling, by a local subscription manager, use of a hardware bundle to service a subscription; while the hardware bundle is enabled for use and by the local subscription manager: obtaining a subscription update for the subscription; making a determination regarding whether an updated subscription based on the subscription update is serviceable using the hardware bundle; in an instance of the determination where the updated subscription is not serviceable using the hardware bundle: migrating a workload governed by the subscription from the hardware bundle to obtain an unencumbered hardware bundle; replacing at least one indirectly manageable hardware resource in the unencumbered hardware bundle to obtain an updated hardware bundle; and migrating the workload to the updated hardware bundle.

Making the determination may include estimating a capacity of the hardware bundle; and comparing the capacity to a capacity requirement of the updated subscription.

Migrating the workload governed by the subscription may include instructing a hardware resource that supports the workload and is not a member of the hardware bundle to reduce use of the hardware bundle.

Migrating the workload governed by the subscription may include instructing a directly manageable hardware resource of the hardware bundle to misreport workload handling capacity to a hardware resource that supports the workload and is not a member of the hardware bundle to reduce use of the hardware bundle.

The misreporting of the workload handling capacity may indicate that the hardware bundle has a lower level of capacity for supporting the workload than an actual level of the capacity for supporting the workload of the hardware bundle.

Replacing the at least one indirectly manageable hardware resource may include identifying an unallocated indirectly manageable hardware resource that is manageable by a directly manageable hardware resource of the unencumbered hardware bundle and based, at least in part, the updated subscription; and bundling the unallocated indirectly manageable hardware resource in the unencumbered hardware bundle.

An indirectly manageable hardware resource of the hardware bundle may be unmanageable by the local subscription manager, and a directly manageable hardware resource is manageable by the local subscription manager.

The directly manageable hardware resource may be upstream of communications of the indirectly manageable hardware resource, and may be adapted to at least partially selectively screen the communications from the indirectly manageable hardware resource to manage functionality of the indirectly manageable hardware resource.

A non-transitory media may include instructions that when executed by a processor cause the computer-implemented method to be performed.

A managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices (e.g., data processing systems) that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services. Changes in the hardware and/or software components may provide for various types of different computer implemented services to be provided over time.

The computer implemented services may include any number and type of computer implemented services. The computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
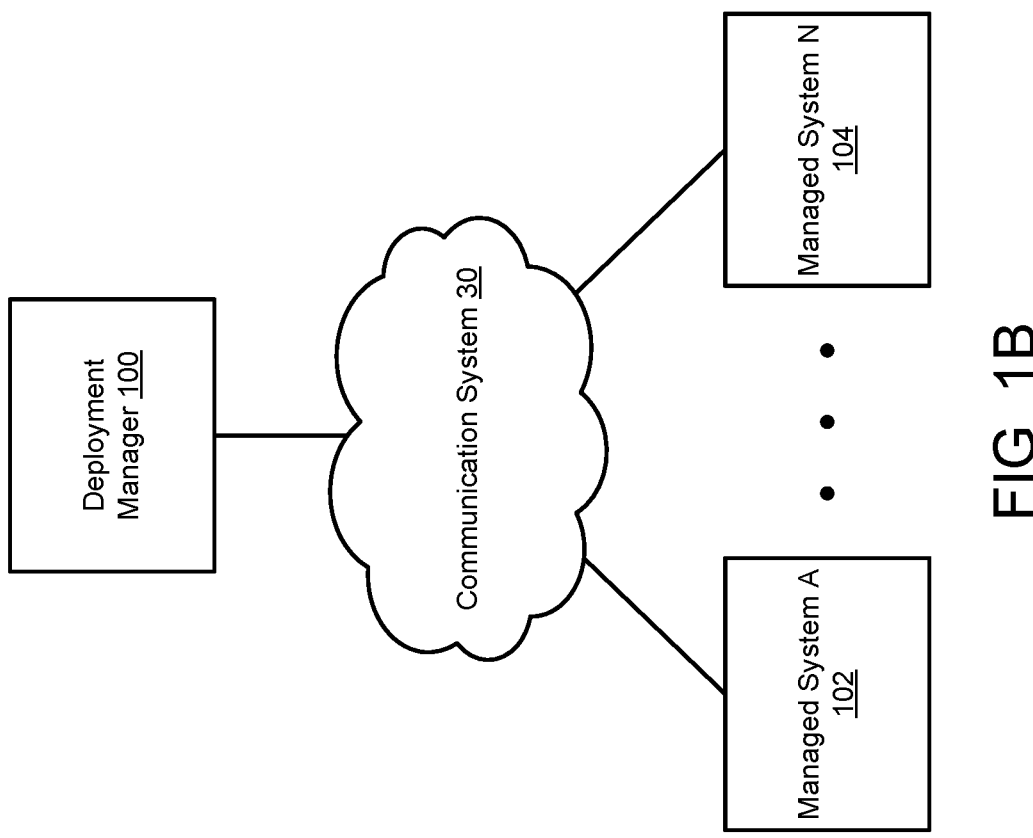
FIG. 1B shows a block diagram illustrating a deployment in accordance with an embodiment.
Figure 1C:
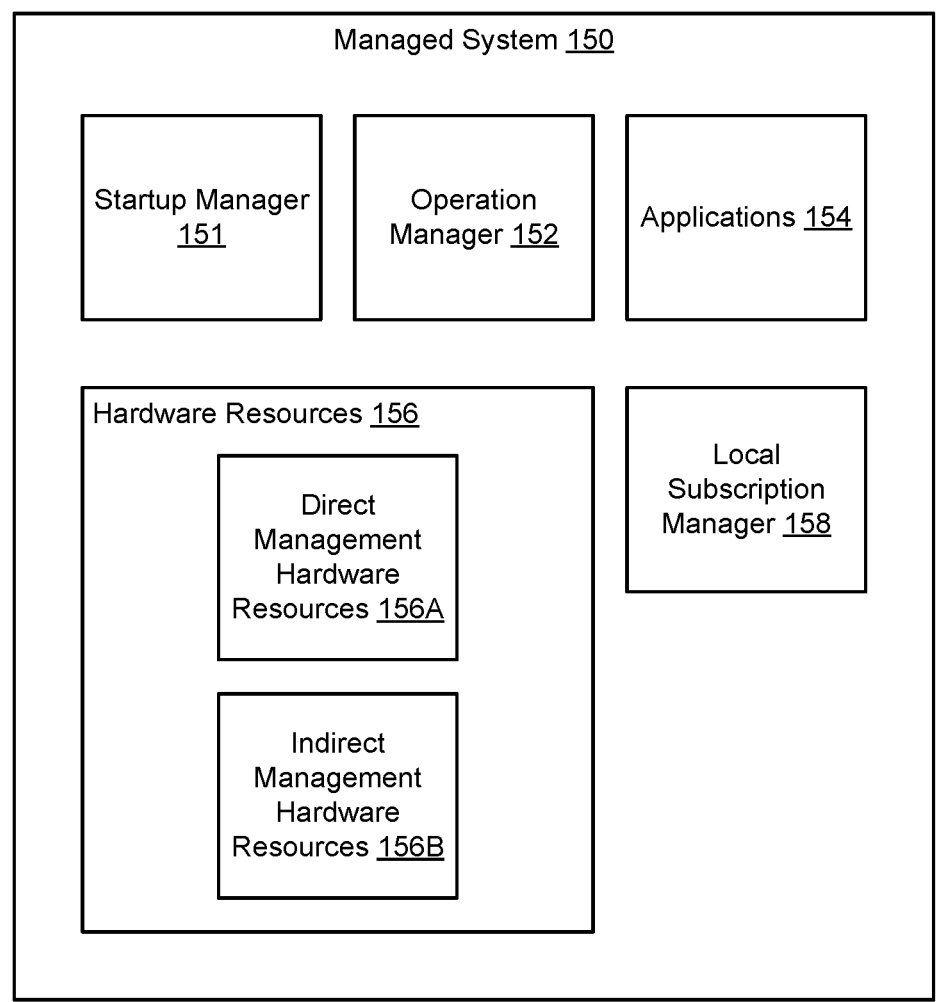
FIG. 1C shows a block diagram illustrating a managed system in accordance with an embodiment.

To provide the aforementioned computer implemented services, any of managed systems 22 (e.g., 22A, 22N) may need to operate in a predetermined manner. For example, certain hardware components may need to be operational and/or certain software components may need to be operating for the managed systems to provide computer implemented services (e.g., to operate as a solution). Different configurations of the hardware components, software components, and/or applications may need to be implemented by managed systems 20 depending on the computer implemented services desired to be provided by the respective managed systems. Refer to FIG. 1C for additional details regarding managed systems 20.

Additionally, any number of the managed system may operate (e.g., as part of a deployment) to provide various computer implemented services independently or cooperatively with other such managed systems. In such scenarios, the operation of a group of managed system may be managed by a local control plane for those managed systems. Refer to FIG. 1B for additional details regarding groups of managed systems.

However, to provide desired computer implemented services, as noted above, a managed system may need to have certain capabilities. For some capabilities, such as those that are provided by software components, a lack of the capability may be remediated by deploying appropriate software components (which may assume that certain hardware components necessary for operation of the software components are available). However, some capabilities may require certain hardware components to be present in a managed system.

For example, in a data storage scenario, a managed system may need to include a hardware storage controller for certain storage functionalities (e.g., deduplication, redundancy, etc.) to be provided. In another example, a managed system may need to include a graphics processing unit, application specific integrated circuit, or other type of special purpose hardware device to provide other types of functionalities (e.g., at a desired rate, and/or to provide the functionality at all). In a further example, a managed system may need to include minimum quantities and/or types of general computing components such as processors, memory modules, storage devices, etc. for other types of functionalities to be provided at certain rates to meet service level agreement requirements or other types of service requirements.

If a managed system is instructed to perform various functionalities but which is unable to provide the functionalities due to lack of hardware components, then the managed system may not provide the functionalities. Further, if operating in cooperation with other managed systems to provide various functionalities, a failure in the ability of the managed system to provide specified functionalities may impact the ability of all of the managed systems to provide desired functionalities. Thus, if capabilities of managed systems are not carefully considered when making configuration decisions, the resulting configured managed systems may be unable to provide or may only provide impaired (to some extent) desired computer implemented services.

In general, embodiments disclosed herein relate to system, devices and methods for managing one or more managed systems (e.g., 20) in a manner that may improve the likelihood of the managed system being able to provide desired computer implemented services over time. To do so, a system in accordance with embodiments disclosed herein may provide a distributed system for automatically identifying and implementing hardware and/or software configurations of managed systems (e.g., to provide an integrated solution). The distributed system may automatically perform processes for discovering capabilities of managed systems, and configuring the managed systems to provide desired solutions.

To manage for configuration of the managed systems, users of the managed systems may enter into subscriptions for use of the managed systems. The subscriptions may define how the users are allowed to use the systems. The specific configurations of the managed systems may be set based on the subscriptions.

To provide for system flexibility in implementation of the subscriptions, the system of FIG. 1A may implement a distributed management model where different authority for implementation of subscriptions is granted to different entities. By distributing the authority for decision making, efficiency of resource use may be improved. For example, by placing authority for lower level configuration decisions at local entities that may have access to more information regarding local resources, the local entities may be in a better position to make configuration decisions when compared to high level management entities.

To improve the likelihood of managed systems being able to provide desired services over time, managed systems may be over provisioned with resources when compared to those resources necessary to provide services known to be desired at the time of deployment. Use of the over-provisioned resources (e.g., processors, memory modules, storage devices, communication components, etc.) may be limited until additional subscriptions are agreed to by the users of the managed systems. Once the additional subscriptions are established, use of the over-provisioned resources may be enabled.

To facilitate management of resources in accordance with subscriptions, the managed systems may bundle hardware components with different management capabilities together to established hardware bundles that are manageable in accordance with subscriptions. For example, some hardware components may be directly manageable hardware components that include functionality to selectively enable/disable their functionalities while other hardware components may be indirectly manageable hardware components. In contrast to directly manageable hardware components, indirectly manageable hardware components may lack functionality to selectively enable/disable their functionalities. However, by establishing hardware bundles, the overall functionality of directly and indirectly manageable hardware components may be made directly manageable at a bundle level. Consequently, the bundle level management functionalities of the hardware bundles may be used to conform the operation of the managed systems to those functionalities which are subscribed to by the users of the managed systems.

To monitor use of resources for different subscriptions, a distributed data collection model may be used. The distributed data collection model may collect data from various hardware resources and hardware bundles regarding workloads performed by these components. The collected data may be used to ascertain the relative use of various hardware bundles for providing subscribed to services. For example, the collected data may allow workloads being performed by hardware bundles for various subscriptions to be isolated to ascertain trues levels of use of hardware bundles by subscribed entities. The true levels of use may be used to ascertain whether subscription limits have been reached.

To limit the impact that reaching subscription limits may have on users, proactive action may be taken ahead subscription limits being reached. The proactive action may include (i) attempting to increase subscription limits, and (ii) modifying workloads governed by subscriptions (e.g., to reduce use of hardware bundles subject to limits under the subscriptions).

While hardware bundles are used, subscriptions for services provided using the hardware bundles may be updated. When updated, the hardware bundles may lack sufficient resources to facilitate timely completion of workloads governed by the subscriptions. In such cases, the workloads governed by the subscriptions may be temporarily migrated to unencumber the hardware bundles to facilitate replacement of components of the hardware bundles and/or other types of modifications while managing impact on the workloads.

By doing so, embodiments disclosed herein may (i) reduce the cognitive burden for selecting and managing systems to provide desired computer implemented services, (ii) may improve the quality of computer implemented services by increasing the likelihood of managed systems being able to provide desired functionalities over time, and/or (iii) facilitating subscription management in distributed systems.

To provide the above noted functionality, a system in accordance with an embodiment may include subscription management service 10. Subscription management service 10 may facilitate (i) selection and procurement of managed systems to a client site (e.g., a deployment location), and (ii) automatic configuration of managed systems 20 to provide an integrated solution and/or different solutions over time. To do so, subscription management service 10 may (i) obtain information indicating desired functions of one or more of managed systems 20, (ii) select and deploy one or more managed systems 20 to a client site (e.g., which may be stored in managed systems supply 12 prior to deployment), (iii) track changes in the solution compatibilities of managed systems 20 over time, and (iv) use the tracked changes in solution capabilities to select and deploy changes in solutions provided by managed systems 20.

To deploy a new solution, a software stack (e.g., operating system, applications, drivers, etc.) may be instantiated on a managed system. However, various software stacks may have requirements regarding hardware resources necessary for operation of the software stacks. The tracked changes in the solution capabilities may be used to restrict (e.g., from deployment) software stacks that may be impaired (e.g., entirely or partially) when deployed to a managed system and allow other software stacks that may be unlikely to be impaired when deployed to the managed systems.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities (e.g., over provisioned) than those required to immediately address a request from the requesting entity. The selection may be made on the basis that the requesting entity may be likely to request additional features and/or capabilities in the future. Consequently, managed systems 20, when deployed to a client site (e.g., private or shared datacenter), may include sufficient hardware components to address a range of different use cases and solution, beyond those that may be immediately apparent to a requesting entity. The additional capabilities (e.g., various hardware resources) may take the form of, for example, additional processors, memory modules, storage devices, graphical processing units, network interface devices, and/or other types of hardware components. Likewise, compatibility with various types of software components may be taken into account such that a range of different software components may be dynamically deployed to managed systems 20 over time (e.g., based on changing uses of managed systems 20).

The distributed system may allow a provider of managed systems 20 to selectively manage various functionalities provided by managed systems 20. For example, the distributed system may allow for different solutions to be provided by managed systems 20 over time. By doing so, a provider of managed systems 20 may tailor the functions provided by managed systems 20 (e.g., from all possible functions) to only those requested, desired, and/or procured (e.g., subscribed to) by an operator, manager, and/or user of managed systems 20. Doing so may allow for cost controls for various solutions to be put in place by a user of a managed system.

For example, consider a scenario where a provider of a managed system does so on a contractual basis where a user of the managed system agrees to purchase subscriptions for various functionalities, hardware components, and/or software components (e.g., the aggregate being solutions). The user may use subscription management service 10 to select to which of the aforementioned solutions the user wishes to have enabled, to the extent of such enablement, durations of enablement, etc. After an initial selection leading to deployment of managed systems 20, the user may modify their subscription to allow for other solutions to be provided by managed systems 20. In response, subscription management service 10 may cooperate with local subscription managers hosted by managed systems 20 to reconfigure the operation of managed systems 20 to allow these additional features to be utilized by the users. However, by virtue of the nature of the distributed system, subscription management service 10 may not have access to accurate capability information for various managed systems. Consequently, subscription management service 10 may make configuration decisions not based on accurate information. To address such configuration decisions, as discussed above, a distributed decision making model may be used so that local subscription managers may automatically take action (i) contrary to requests received from subscription management service 10, and/or (ii) independently from subscription management service 10. By doing so, embodiments disclosed herein may automatically reduce the impact of inaccurate information on the operation of the distribute system.

To allow for users or other persons associated with managed systems to elect into such subscriptions, subscription management service 10 may provide graphical user interfaces that allow such selections to be made. The graphical user interfaces may be implemented, for example, as webpages (or other types of interfaces) accessible to the users or other persons via other devices (e.g., client/user devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service. In some cases, the local subscription managers may reject the modifications in operation of managed systems 20, which may prompt subscription management service 10 to reconsider its configuration decisions for managed systems 20.

To facilitate solution selection, the graphical user interfaces presented to the users may present solutions that are compatibility with managed systems 20. The presented solutions may be based on a current configuration and/or capabilities of managed systems 20. Accordingly, the persons tasked with managing managed systems 20 may not need to be aware of the current configuration of managed systems 20 to identify which solutions the managed systems may provide.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), (iii) code blocks or other information (e.g., lists of actions) usable to revert a previously implemented modification of the operation of a managed system to comply with an elected subscription, and/or (iv) intermediate representations of desired configurations.

The intermediate representations may include functionalities, capabilities (e.g., performance expectations/requirements), and/or other features of a solution to be provided to subscribed users. However, the intermediate representations may not specify the hardware components to provide the solution, the software components, etc. As will be discussed in greater detail below, the distributed management model may vest authority in the local subscription managers to make decisions regarding which hardware and software components to use, and configurations to ensure that the solution is provided to subscribed users.

By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information). Consequently, user access to solutions provided by managed systems may be automatically revoked by the managed systems thereby facilitating distributed management of the managed systems that does not rely on or require communication with other entities.

For example, the local subscription managers may granularly characterize workloads performed by various hardware resources and hardware bundles to determine whether subscription limits have been reached. In making the determination, the local subscription managers may deploy and use data collection agents to collect information from hardware bundles and hardware resources regarding the workloads that they perform. The workloads may be mapped to different subscriptions to ascertain the relative levels of use of the resources under each of the subscriptions. For example, various workloads performed by hardware bundles may be isolated by tracing data used in the workloads upstream to ascertain to which subscription each workload should be mapped. Consequently, granular use of various hardware resources may be identified and used to ascertain whether subscription limits have been reached.

To improve the likelihood of continued use of services provided by managed systems, the local subscription managers may proactively attempt to modify subscriptions and workloads to prevent subscription limits from being reached. For example, subscribers may be automatically notified of when limits are likely to be reached. Additionally, the workloads performed under subscriptions may be modified, for example, to reduce use of resources such as various hardware bundles governed by the subscriptions. Consequently, use of services governed by subscriptions may be more likely to be maintained over time.

While hardware bundles are used to provide subscriptions, the subscription may be modified over time while the hardware bundles are in use. The changes to the subscription may cause the hardware bundles allocated for providing services governed under the subscriptions unable to meet the requirements (e.g., rate, volume, etc.) of the updated subscriptions. To enable the hardware bundles to meet the requirements of the subscriptions, the hardware bundle members (e.g., hardware resources) may be updated in a manner that manage impacts on workloads governed by the subscriptions. Consequently, the workload governed by the subscription may be more likely to meet the requirements even while membership of the hardware bundles is updated over time.

Any of subscription management service 10, managed systems supply 12, and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

In an embodiment, one or more of subscription management service 10, managed systems supply 12, and managed systems 20 are operably connected via communication system 30. Communication system 30 may allow any of subscription management service 10, managed systems supply 12, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 6), a public network, and/or may include the Internet. For example, managed systems 20 may be operably connected to subscription management service 10 via the Internet. Subscription management service 10, managed systems supply 12, managed systems 20, and/or communication system 30 may be adapted to perform one or more protocols for communicating via communication system 30.

While illustrated in FIG. 1A with a limited number of specific components, a system may include additional, fewer, and/or different components without departing from embodiments disclosed herein.

Turning to FIG. 1B, a block diagram illustrating a deployment including managed systems 102, 104 in accordance with an embodiment is shown. Like named components in FIGS. 1A-1B may be similar.

The deployment may provide any number and type of computer implemented services. The deployment may be located, for example, at a user selected site, a data center, or another location. The deployment may provide various solutions to users of, for example, an organization on a contractual basis. For example, the organization may agree to pay fees for the solutions provided by the deployment. The solutions may include any number and type of computer implemented services provided by any number of managed systems 102, 104.

The deployment may include deployment manager 100. Deployment manager 100 may locally manage any number of managed systems. For example, the subscription management service may provide information to deployment manager 100 which may in turn manage managed systems 102, 104 based on the information.

To facilitate management, deployment manager 100 may (i) host various software images to facilitate deployment of software necessary for various solutions for managed systems 102, 104, (ii) facilitate identification of solutions compatible with managed systems 102, 104, (iii) provide information regarding the compatible solutions to other entities (e.g., such as the subscription management service), and/or (iv) provide other management functionalities. However, like the subscription management service, deployment manager 100 may operate with inaccurate information regarding the capabilities and/or configurations of managed systems 102, 104. Consequently, the information that it may provide to subscription management service 10 may also be inaccurate.

Deployment manager 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

Deployment manager 100 may be implemented with a distributed service hosted by any number of managed systems. Thus, while shown separately from managed systems 102-104 in FIG. 1B, it will be appreciated that the functionality of deployment manager 100 may be provided by any of managed systems 20.

Turning to FIG. 1C, a block diagram illustrating managed system 150 in accordance with an embodiment is shown. Managed system 150 may be similar to any of managed systems 20, shown in FIGS. 1A-1B. Managed system 150 may provide desired computer implemented service by allowing for its automatic reconfiguration over time based on subscriptions maintained by subscription management service 10, shown in FIG. 1A. When reconfigured, managed system 150 may provide a solution which may be provided with a software stack hosted by managed system 150. Managed system 150 may be reconfigured by, for example, deploying different software stacks, startup management entities (e.g., basic input output systems (BIOSs), configuration of the operation of hardware/software components, and/or enabling/disabling hardware components.

Figure 6:
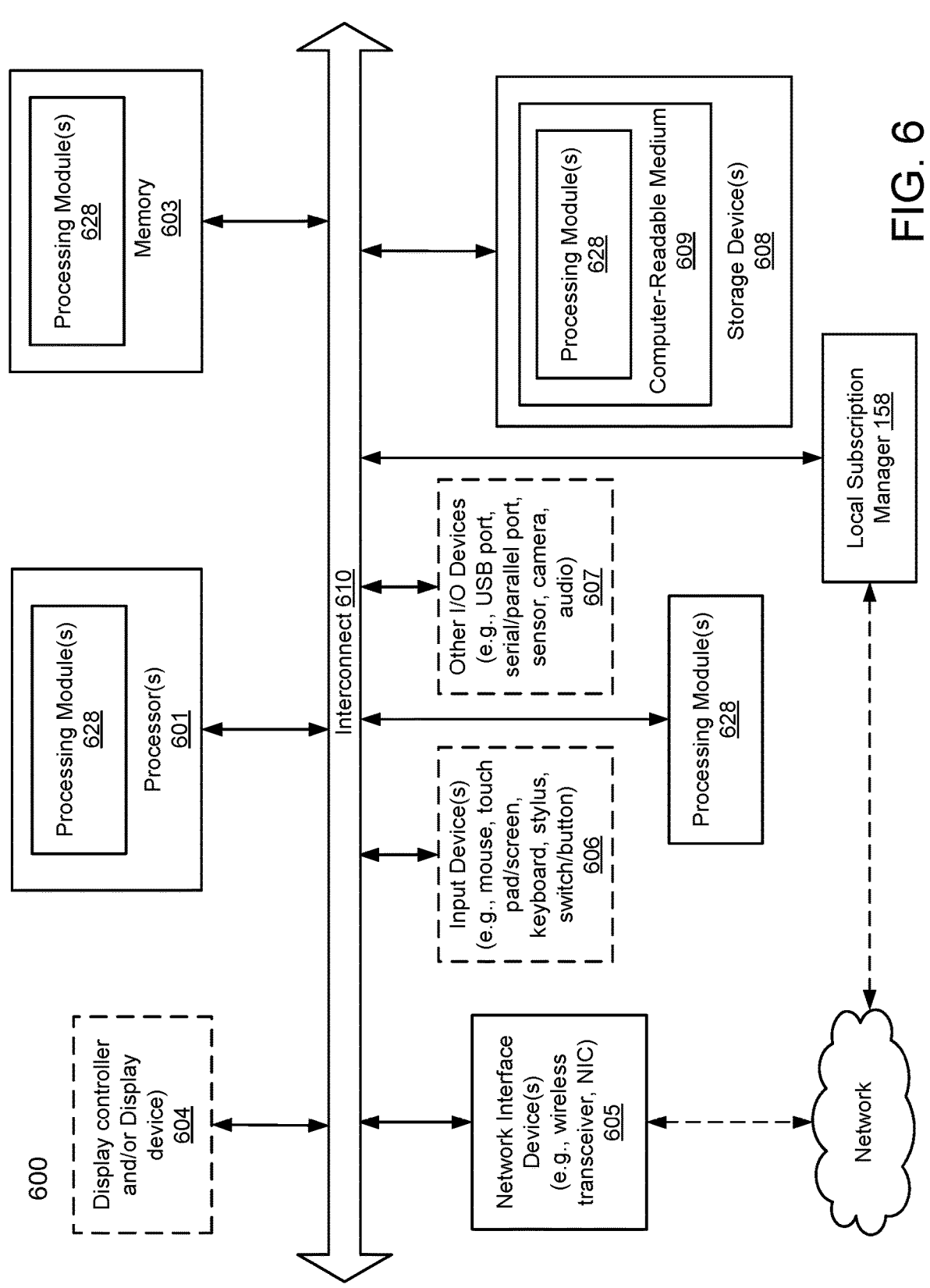
FIG. 6 shows a block diagram illustrating a computing device in accordance with an embodiment.

In addition (and/or alternatively) to any of the components shown in FIG. 6, managed system 150 may include startup manager 151, operation manager 152, applications 154, hardware resources 156, and local subscription manager 158. Each of these components is discussed below.

Startup manager 151 may manage placing managed system 150 in an operating state conducive to operation of applications 154. For example, after managed system 150 is power cycled, managed system 150 may not be in a state in which application 154 may operate. To enter the operating state, managed system 150 may perform any number processes such as (i) a power on self-test, (ii) performing an inventory of hardware resources 156, and (iii) beginning execution of and/or handing off operation management of managed system 150 to operation manager 152. Startup manager 151 may be implemented with, for example, a basic input output system (BIOS) or other type of startup management entity.

Operation manager 152 may generally manage operation of the components of managed system 150, except for local subscription manager 158. For example, operation manager 152 may be implemented with an operating system, drivers, and/or other types of management entities used to manage hardware resources 156 of managed system 150 to facilitate execution of applications 154.

To facilitate dynamic changes in solutions provided by operation manager 152 and/or applications 154, local subscription manager 158 may facilitate automatic deployment of software stacks and/or startup managers to managed system 150. The deployed software stacks may include all, or a portion, of operation manager 152 and applications 154. To ensure that only software stacks compatible with hardware resources 156 are deployed, local subscription manager 158 may maintain current information regarding hardware resources such as the types and quantities of hardware devices of hardware resources 156. Local subscription manager 158 may use the current information to identify compatibility between managed system 150 and various solutions, and enforce solution limitations (e.g., restrict) on managed system 150. Further, local subscription manager 158 may use the current information to determine whether to honor or rejection subscription updates to prevent configurations for the managed system 150 that may impair its operation (or require it to perform various actions that it cannot fulfill) from being enforced on managed system 150.

To facilitate management of hardware resources 156, local subscription manager 158 may bundle various types of hardware resources 156 together for subscription purposes. For example, hardware resources 156 may include direct management hardware resources 156A and indirect management hardware resources 156B.

Direct management hardware resources 156A (e.g., also referred to as directly manageable hardware components) may include hardware devices that include functionality to selectively limit their use. For example, direct management hardware resources 156A may include controllers, data processing units, communication chips, and/or other types of devices that may be configured to allow or disallow use of their functionalities. These resources may be directly managed by local subscription manager 158 via, for example, sideband communications through which local subscription manager 158 may directly modify the operation of these devices.

In contrast, indirect management hardware resources 158B (e.g., also referred to as indirectly manageable hardware components) may include hardware devices that do not include functionality to selectively limit their use. As a consequence, local subscription manager 158 may not be able to use sideband communications (or other types of communications) to modify how these hardware resources operate directly. As will be discussed in greater detail below, local subscription manager 158 may bundle some direct management hardware resources 156A with other indirect management hardware resources 156B such that the functionality of the bundle, as a whole, may be directly managed by local subscription manager.

Figure 1D:
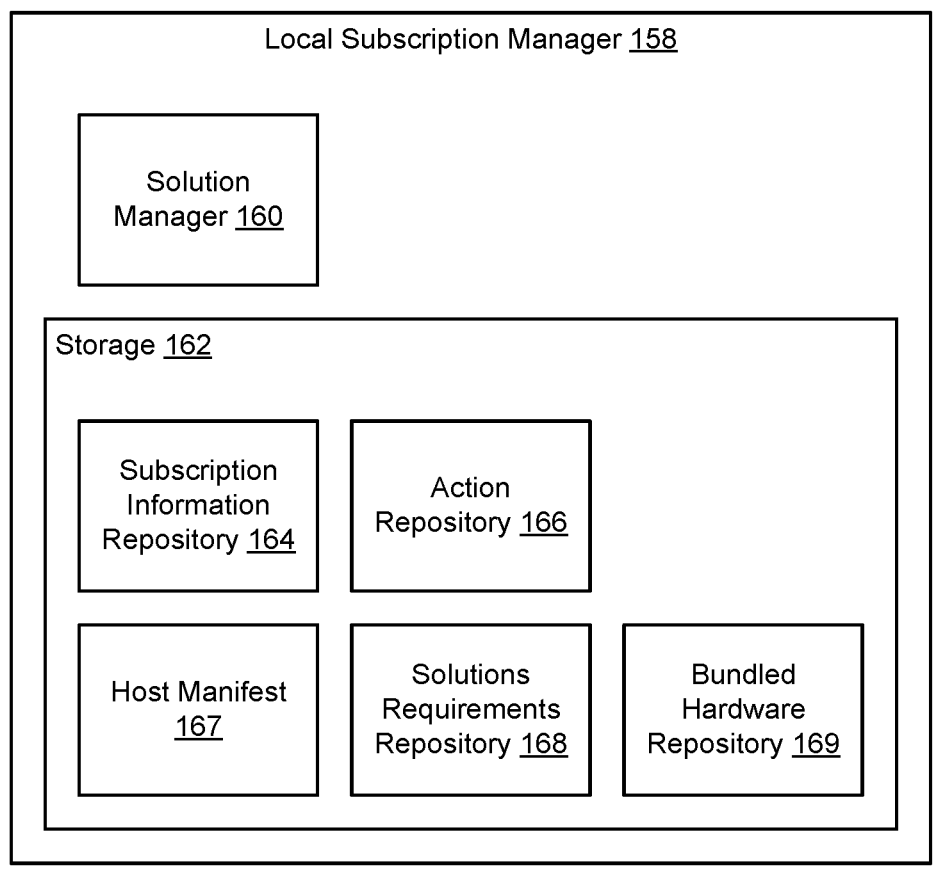
FIG. 1D shows a block diagram illustrating a local subscription manager in accordance with an embodiment.
Figure 1E:
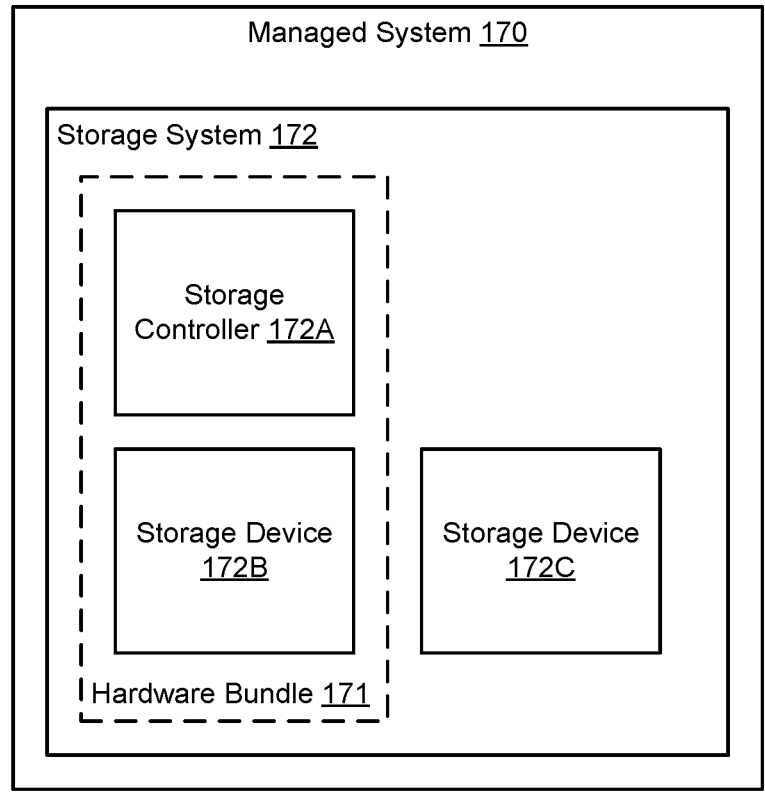
FIGS. 1E-1G show block diagrams illustrating example managed systems in accordance with an embodiment.
Figure 1F:
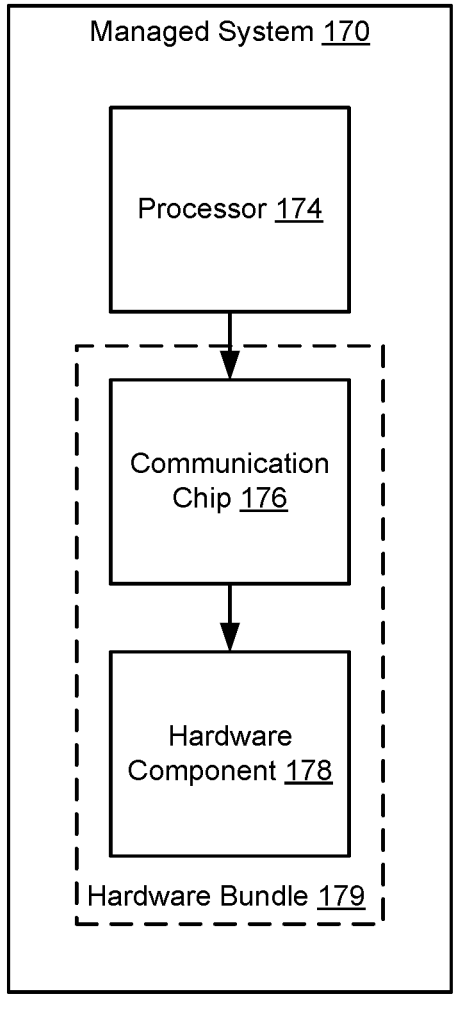
Figure 1G:
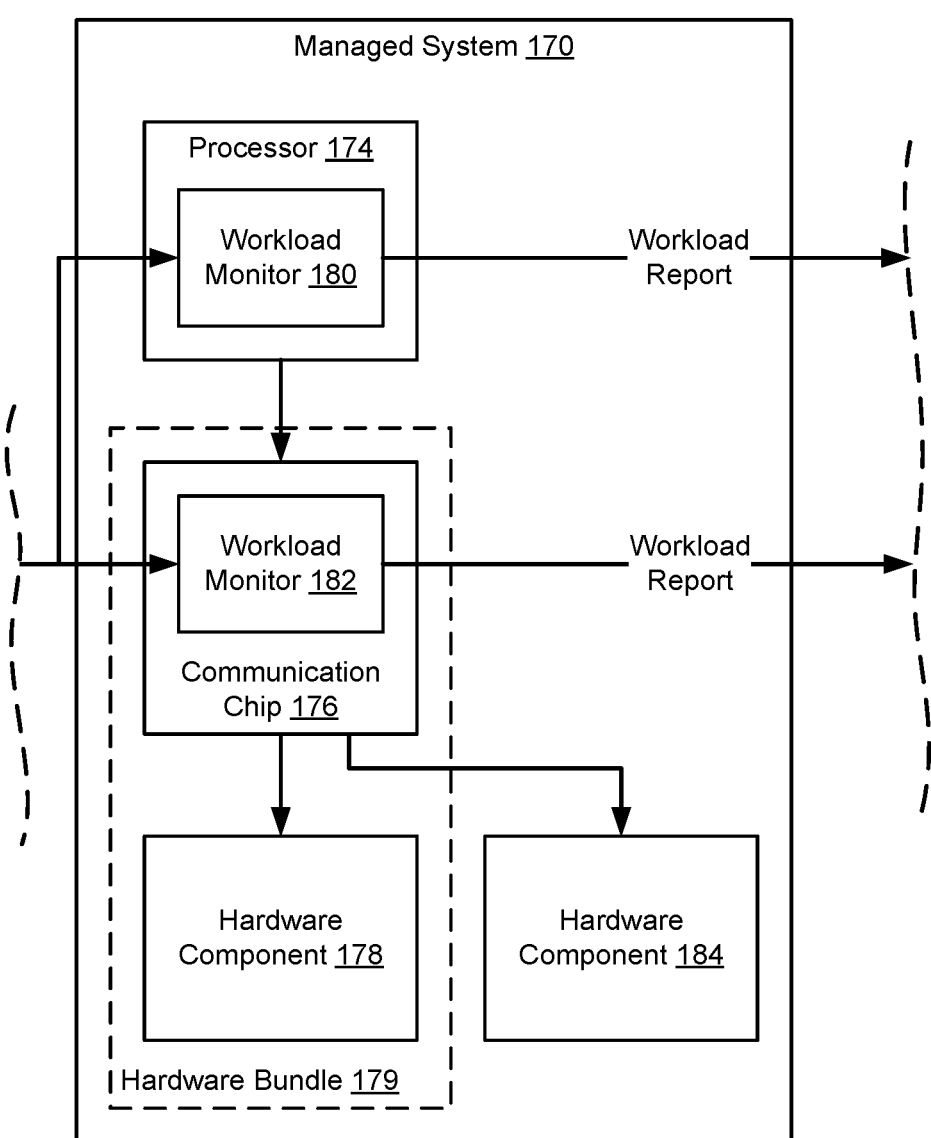

To facilitate management of use of various hardware resources, local subscription manager 158 may granularly characterize the workloads performed by various hardware resources and hardware bundles. The workloads may be mapped to various subscriptions to identify the level of use of different hardware resources for different subscriptions. To map the workloads, local subscription manager 158 may deploy various monitors to the hardware resources. The monitors may track operations performed by the resources, communications between the resources, and/or other characteristics of the operation of the hardware resources (e.g., in aggregate referred to as hardware resource operation information). The hardware resource operation information may be used to trace the workloads to corresponding subscriptions, for mapping purposes. Refer to FIGS. 1E-1G for additional details regarding managing the functionality and use of hardware bundles to facilitate subscription enforcement.

To reduce the likelihood of use of the services provided by managed system 150 being cut off, local subscription manager 158 may proactively monitor use of various subscriptions and take action to reduce the likelihood of subscription limits being reached. The proactive action may include (i) attempting to modify subscription limits, and (ii) reducing use of resources such as various hardware bundles in workloads governed by the subscriptions.

Additionally, as subscriptions are updated over time, local subscription manager 158 may automatically modify hardware bundle membership. For example, local subscription manager 158 may add and remove hardware resources from hardware bundles to match the performance of the hardware bundles to the requirements of subscriptions which govern workloads supported by the hardware bundles. When modifying the membership in a hardware bundle, local subscription manager 158 may migrate workloads away from and back to hardware bundles to reduce the impact of changes in membership of the hardware bundles on compliance with subscriptions that govern the workloads performed by the hardware bundles.

Applications 154 may provide all, or a portion, of the computer implemented services desired by a user, operator, or other person associated with managed system 150. Applications 154 may utilize hardware resources 156 to provide their respective functionalities. The type and quantity of applications 154 that may be hosted by managed system 150 may depend on hardware resources 156 (e.g., types and quantity of hardware devices). Thus, the functionalities provided by a managed system may be limited by enforcing use limits on hardware resources 156.

Operation manager 152 may mediate presentation of hardware resources 156 to applications 154 by, for example, scheduling use, managing discontinuous access, and/or performing other actions to coordinate use of hardware resources 156 by applications 154 (and/or other entities). Consequently, the operation of applications 154 may be predicated on the operation of operation manager 152 as well as capabilities of hardware resources 156.

In an embodiment, one or more of startup manager 151, operation manager 152, and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of startup manager 151, operation manager 152, and applications 154. One or more of startup manager 151, operation manager 152, and applications 154 may be implemented using other types of hardware devices without departing embodiment disclosed herein.

In an embodiment, one or more of startup manager 151, operation manager 152, and applications 154 is implemented using a processor adapted to execute computing code stored on a persistent storage that when executed by the processor performs the functionality of one or more of startup manager 151, operation manager 152, and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 (e.g., also referred to as hardware components) may include any type and quantity of hardware devices usable to provide computer implemented services. Hardware resources 156 may provide their functionality by, for example, consuming power to perform various actions that result in the performance of startup manager 151, operation manager 152, applications 154, and/or other entities not shown in FIG. 1C. As part of their respective operation, hardware resources 156 may host firmware (and/or other types of software such as monitors) and/or may otherwise be programmable to facilitate their respective operation. However, some hardware resources may lack capabilities to customize their operation to, for example, enforce subscription limitations, monitor their operation, and/or otherwise be manageable by local subscription manager 158 (e.g., indirect management hardware resources 156B may lack such capabilities entirely or in part).

Various changes in subscriptions may cause various portions of hardware resources 156 to be enabled or disabled, as discussed above, at the resource or bundle level. Consequently, even though physical hardware may be present in managed system 150, some of the physical hardware may not be usable (e.g., may be powered down, may be programmed to not operate, etc.) even though it could be usable. Accordingly, information regarding the existence of physical hardware of managed system 150 may not be used to accurately determine the actual capabilities of managed system 150, since any quantity of hardware resources 156 may not actually be usable.

Local subscription manager 158 may provide subscription management services. The subscription management services may include (i) obtaining information regarding subscriptions, (ii) implementing the subscriptions by enabling/disabling hardware resources, deploying software instances, etc., and (iii) establishing and using hardware bundles of hardware resources 156 to force compliance with subscription limitations. Refer to FIG. 1E for additional information regarding local subscription manager 158.

Local subscription manager 158, subscription management service 10, and/or deployment manager 100 may cooperate to enforce subscriptions on managed system 150. Local subscription manager 158, subscription management service 10, and/or deployment manager 100 may also perform one or more authentications of one another and/or communications from these components to prevent other entities from interfering with the cooperative operation of local subscription manager 158, subscription management service 10, and/or deployment manager 100 for managed system management purposes.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 610, shown in FIG. 6), and may operate independently from other components (e.g., hardware and software) of managed system 150. The management controller may include functionality to manage the operation, configuration, and/or other characteristic of any hardware and/or software component of managed system 150. For example, the management controller may include functionality to load software stacks on managed system 150, obtain information regarding hardware resources 156, modify operation of hardware resources 156, etc.

In an embodiment, the management controller includes a separate communication interface (e.g., from that of a communication interface of managed system 150) through which it communicates with subscription management service 10, deployment manager 100, and/or hardware resources 156. In an embodiment, the management controller uses the same communication interface which managed system 150 uses to communicate with other devices. Either of these communication interface may facilitate communications with communication system 30, and devices connected to communication system 30 such as subscription management service 10 or deployment manager 100. The management controller may present itself as a separate device to other entities (e.g., which may be associated with its own network endpoint).

When providing its functionality, local subscription manager 158 may perform all, or a portion, of the methods and operations illustrated in FIGS. 2-5B. Refer to FIG. 1D for additional details regarding local subscription manager 158.

While illustrated in FIG. 1C with a limited number of specific components, a managed system may include additional, fewer, and/or different components without departing from embodiments disclosed herein.

Turning to FIG. 1D, a block diagram of local subscription manager 158 in accordance with an embodiment is shown. Local subscription manager 158 may be implemented with a computing device similar to that illustrated in FIG. 6. In addition (and/or alternatively) to any of the components shown in FIG. 6, local subscription manager 158 may include solution manager 160 and storage 162. Each of these components is discussed below.

Solution manager 160 may include functionality to (i) obtain information regarding hardware resources of a host managed system, (ii) establish hardware bundles to facilitate compliance with subscriptions, (iii) enable/disable hardware bundles and/or individual hardware resources to enforce subscription limits, (iv) characterize hardware bundles with respect to workload performed to service various subscriptions, (v) proactively monitor for when subscription limits are likely to be reached, (vi) attempt to modify subscription limits and/or workloads to reduce the likelihood of the subscriptions limits being reached, (v) modify hardware bundle membership over time based on changes to subscriptions, and/or otherwise modify the operation of a host managed system to enforce compliance with subscriptions.

In an embodiment, solution manager 160 is implemented using a hardware device including circuitry. The hardware device may be, for example, a digital signal processor, a field programmable gate array, or an application specific integrated circuit. The circuitry may be adapted to cause the hardware device to perform the functionality of solution manager 160. Solution manager 160 may be implemented using other types of hardware devices without departing embodiment disclosed herein.

In an embodiment, solution manager 160 is implemented using a processor adapted to execute computing code stored on a persistent storage that when executed by the processor performs the functionality of solution manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a device that hosts local subscription manager 158.

Storage 162 may store data structures including subscription information repository 164, action repository 166, host manifest 167, solution requirements repository 168, and bundled hardware repository 169.

Subscription information repository 164 may be implemented with one or more data structures that store information regarding subscriptions for a managed system that hosts local subscription manager 158. The information may include, for example, the subscriptions to be enforced on the host managed system, limitations on the subscriptions (e.g., duration based, use based, etc.), and/or disablement actions for the subscriptions. The disablement actions may be implemented with code blocks that may be pushed to the host managed system for execution. When executed, the host managed system may perform the disablement actions which may, for example, cause various hardware/software components to be enabled/disabled, and/or reconfigured (e.g., through reformatting of storage device, modification of settings, etc.). Likewise, the disablement actions may cause hardware bundles to change their operation to comply with subscription limitations.

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by solution manager 160 when a condition is met, such as a subscription limit being exceeded or a new subscription being obtained.

In an embodiment, action repository 166 includes at least one set of actions keyed to changes in subscription of a management entity for the host managed system. The actions may include (i) restarting/initializing a host managed system, (ii) after doing so, interrupting a normal startup process performed by the host managed system prior to the host managed system booting to a management entity, (iii) while the normal startup process is interrupted, dynamically configuring a management entity, and/or (iv) resuming the normal startup process such that the host managed systems hands off, after startup, operation of the managed system to the dynamically configured management entity. In this manner, the management entity utilized by a host managed system may be dynamically changed over time to meet the needs of users of the host managed system.

Host manifest 167 may be implemented with one or more data structures that store information regarding hardware resources of a host managed system. The information may include, for example, a list of hardware devices, the type of each hardware device, capabilities of each hardware devices, whether the hardware devices is a direct and/or indirect management device, and/or other information regarding the hardware resources of the host managed system. Host manifest 167 may be updated over time to ensure that it is likely to include accurate information.

Solution requirements repository 168 may be implemented with one or more data structures that store information regarding hardware resource requirements for any number of solutions (e.g., to which a host managed system may be subscribed). The information may include, for example, a list of solutions and corresponding hardware resources required for each of the solutions including, for example, list of hardware devices, the type of each hardware device, capabilities of each hardware device, and/or other information regarding the hardware resources that should be available for a solution to be implemented by a managed system.

The information included in solution requirements repository 168 may be flexible and provide a variety of different hardware options that may allow for a solution to be performed. Consequently, when a subscription for a solution is obtained, solution manager 160 may find a best fit to the hardware resources of a host managed system. Thus, when a subscription for a solution is obtained, the subscription may not specify the hardware to be used to implement the solution. Rather, the subscription may define an intermediate representation of goals, outcomes, criteria, etc. for ascertaining whether the solution has been provided. Solutions requirements repository 168 may include information that allows for a broad variety of different hardware resources to be used to enable solution to be provided by different managed systems have different hardware resources.

Bundled hardware repository 169 may be implemented with one or more data structures that store information regarding hardware resources (e.g., direct/indirect management) that have been bundled together. The information may include, for example, (i) hardware resources that are members of each hardware bundle, (ii) performance levels of each hardware bundle, (iii) solutions being provided using the hardware bundles, and/or (iv) use of the hardware bundles to service various subscriptions, etc. For example, the information regarding use of the hardware bundles may include information regarding workloads performed by the hardware bundles for the subscriptions.

While various data structures have been illustrated in and described with respect to FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to local subscription manager 158 (e.g., in a storage of a deployment manager or subscription management service) in a manner that is still accessible to local subscription manager 158.

While illustrated in FIG. 1D with a limited number of specific components, a local subscription manager may include additional, fewer, and/or different components without departing from embodiments disclosed herein.

As discussed above, to enforce subscription limits on managed systems, hardware bundles may be established. To establish the hardware bundles, the local subscription managers may characterize the ability of direct management hardware components to influence the operation of indirect management hardware components. FIGS. 1E-1F show diagram illustrating examples of how hardware bundles may be established in accordance with an embodiment. For brevity, only a limited number of components of the managed system 170 is shown in these figures.

Turning to FIG. 1E, a first block diagram of managed system 170 in accordance with an embodiment is shown. Managed system 170 may be similar to any of managed system 20.

To provide storage services, managed system 170 may include storage system 172. Storage system 172 may include storage controller 172A, storage device 172B, and storage device 172C.

Storage controller 172A may be an example of a direct management hardware components because it may include functionality to limit its operation. For example, storage controller 172A may include functionality to limit its operation, limit communications with other components, to interrogate/modify communications, etc. at the direction of a local subscription manager.

In contrast, storage devices 172B-172C may be example of indirect management hardware components because neither may include functionality to limit their operation based on instructions from a local subscription manager. For example, storage devices 172B-172C may not include sideband interfaces or other mechanisms to communicate with local subscription managers, may not include software or other capability to modify their operation based on instructions from local subscription managers, etc.

However, storage devices 172B-172C may be indirectly controlled by storage controller 172A. For example, storage controller 172A may be in a communication path between the storage devices and other hardware components. Thus, storage controller 172A may limit the functionalities of the storage devices by limiting their ability to communicate with other devices.

To manage the functionalities of managed system 170 to force compliance with subscription limitations, hardware bundle 171 may be established by the local subscription manager. Hardware bundle 171 may be a logical mapping between the capabilities of storage device 172B and the limitations in its operation that may be imposed on it using the functionalities of storage controller 172A. For example, the logical mapping may map use of some of the storage resources (e.g., hardware block addresses) to various abilities of storage controller 172A to limit addressable ranges. Thus, when the capabilities of storage device 172B are presented to other devices via storage controller 172A, some of the hardware block address range of storage device 172B may be concealed thereby disallowing use of some of the capabilities of storage device 172B. While described with respect to address range to limit use of some of the storage space of storage device 172B, it will be appreciated that other capabilities of storage device 172B may be selectively masked by storage controller 172A (e.g., by artificially constraining bandwidth, introducing artificial latency, constraining the rate at which individual operations may be performed, etc.).

Once established, hardware bundle 171 may be used to enforce subscription limits on managed system 170. For example, when subscription limits are reached, the logical mapping may be used to limit use of the storage resources presented by storage device 172B.

Turning to FIG. 1F, a second block diagram of managed system 170 in accordance with an embodiment is shown. Managed system 170 may be similar to any of managed system 20.

To provide data processing services, managed system 170 may include processor 174, communication chap 176, and hardware component 178. Hardware component 178 may be a special purpose hardware device to accelerate certain types of processing, while processor 174 may be a general purpose processor that may offload the types of processing to hardware component 178. To facilitate communications between these devices, communication chip 176 may be positioned to establish a bus or point to point communication link that allows processor 174 to offload processing to hardware component 178.

Communication chip 176 may be an example of a direct management hardware components because it may include functionality to limit its operation. For example, communication chip 176 may include functionality to limit its operation, limit communications with other components, to interrogate/modify communications, etc. at the direction of a local subscription manager.

In contrast, hardware component 178 may be an example of an indirect management hardware components because it may not include functionality to limit its operation based on instructions from the local subscription manager. For example, hardware component 178 may not include sideband interfaces or other mechanisms to communicate with local subscription managers, may not include software or other capability to modify their operation based on instructions from local subscription managers, etc.

To manage the functionalities of managed system 170 to force compliance with subscription limitations, hardware bundle 179 may be established by a local subscription manager. Hardware bundle 179 may be a logical mapping between the capabilities of hardware component 178 and the limitations in its operation that may be imposed on it using the functionalities of communication chip 176. For example, the logical mapping may map use of certain processing functions of hardware component 178 to various abilities of communication chip 176 to facilitate or limit communications between processor 174 and hardware component 178. Thus, when the capabilities of hardware component 178 are attempted to be used by processor 174, communication chip 176 may selectively block use of the processing capabilities by, for example, preventing establishment of communication sessions, dropping certain types of traffic (e.g., associated with different types of processing), by modifying discovery information regarding hardware component 178, and/or via other mechanisms.

Once established, hardware bundle 179 may be used to enforce subscription limits on managed system 170. For example, when subscription limits are reached, the logical mapping may be used to limit (e.g., reduce rate at which workloads may be offloaded) and/or prevent processor 174 from offloading workloads to hardware component 178.

Turning to FIG. 1G, a third block diagram of managed system 170 in accordance with an embodiment is shown. Managed system 170 may be similar to any of managed systems 20.

To ascertain the extent of use hardware bundle 179 to support various subscription, a local subscription manager may instantiate workload monitors (e.g., 180, 182) in hardware bundle 179 and other hardware resources operably connected to hardware bundle 179.

Each workload monitor may monitor (i) operations performed by the monitored component, (ii) data used in the operations, (iii) communications over which the data is transported to from the monitored component, and/or other types of information regarding operation of the monitored components.

As information is obtained by the workload monitors, various workload reports based on the information may be provided to the local subscription manager for analysis.

During the analysis, the local subscription manager may use the information to trace operations and communications to workload performed to service corresponding subscriptions. For example, processor 174 may manage and instantiate workloads under various subscriptions. During performance of the workloads, processor 174 may offload operations to and/or otherwise utilize various hardware bundles. For example, processor 174 may, as part of a workload, send data and instructions to hardware bundle 179 via various communications. These communications may be tracked and reported back as part of workload reports from workload monitor 180.

Similarly, workload monitor 182 may monitor communications from processor 174, data obtained from the communications, communications of data to hardware components 178, 184, and operations performed using the data. This information may be added to workload reports provided by workload monitor 182. These workload reports may be used to trace the operations performed by communication chip 176 to different workloads under different subscriptions based on the data used in the operation, and to estimate the workloads performed by hardware components 178, 184 for the different subscriptions.

For example, because hardware components 178, 184 are not directly manageable, the workloads performed by these components may be estimated based on the data provided to these hardware components via communications that are traceable back to the workloads performed by processor 174.

To do so, for example, the communications initiated by processor 174 and that result in data used in subsequent processes performed by communication chip 176 and hardware component 178 may be used to estimate a magnitude of the workload performed by hardware bundle 179 to service a corresponding subscription. The workload report from workload monitor 182 may include descriptions of operations performed using the data thereby allowing for direct computation of a magnitude of the workload performed by communication chip 176 to service a subscription. The workload report from workload monitor 182 may also include descriptions of the communications, and data included therein, transmitted to hardware component 178. This information may be used to estimate a size of the workload performed by hardware component 178 to service the subscription. The estimate may be made using, for example, a model of the relationship between data provided to and workload performed by hardware component 178. The model may be implemented, for example, using a formula, a lookup table, and/or other type of data structure.

Once the magnitudes of the workloads are obtained, they may be used to obtain an aggregate workload performed to service the subscription. The aggregate workload may be obtained, for example, by summing the separate workloads for each of the components of hardware bundle 179.

The aggregate workload may be used to gauge when subscription limits are likely to be reached. For example, the aggregate workload may be used to estimate when the subscription limits are likely to be reached (e.g., through regression or other types of modeling).

If the aggregate workload indicates that a subscription limits is likely to be reached at a future point in time within a threshold duration, then proactive action may be taken including, for example, attempting to increase subscription limits and modification of use of resources governed under the subscription.

To modify the use of resources governed under the subscription, the local subscription manager may modify operation of resources participating in workloads governed by the subscription. For example, with respect to the example topology shown in FIG. 1G, the local subscription manager may attempt to modify operation of processor 174 to reduce use of hardware bundle 179 in workloads governed under the subscription, or modify operation of hardware bundle 179 to reduce use of hardware bundle 179 to support workloads governed by the subscription.

To modify operation of processor 174, the local subscription manager may send instructions to applications hosted by processor 174 that perform or manage the workloads. The instructions may direct reduced use of hardware bundle 179 in support of the workloads.

However, not all applications and/or management entities may be capable of implementing such instructions. If such capabilities are not present, then local subscription manager may instruct hardware bundle 179 to misreport its capacity for contributing to workloads governed by the subscriptions. For example, communication chip 176 may be instructed to slow communications from processor 174 to hardware component 178 that support workloads under the subscription. Consequently, from the perspective of processor 174 and entities hosted thereby, hardware bundle 179 may have reduced capacity for supporting the workloads, while hardware bundle 179 actually has additional capacity to support the workloads. Thus, processor 174 and entities hosted thereby may automatically reduce use of hardware bundle 179, thereby pushing the point in time when the subscription limit is likely to be reached out in the future without active participation of processor 174 and/or entities hosted thereby.

Similarly mechanisms may be used to modify the use of hardware bundle 179 should the membership of hardware bundle need to be adjusted. For example, when a subscription is modified, the membership of hardware bundle may need to be changed because the performance of hardware bundle 179 is insufficient to meet the performance requirements of a subscription. In such scenarios, the use of hardware bundle 179 may be managed by invoking functionality of the hardware resources (e.g., 174) performing workloads governed by the subscription or functionality of the hardware bundle (e.g., 179) supporting the workloads (e.g., storing data, performing various data processing, etc.). Through either route, the burden on hardware bundle 179 to support workloads governed by the subscription may be lessened such that the bundle membership may be modified with little impact on the workloads. Once the bundle membership has been updated, the burden on the hardware bundle may be increased.

Figure 2:
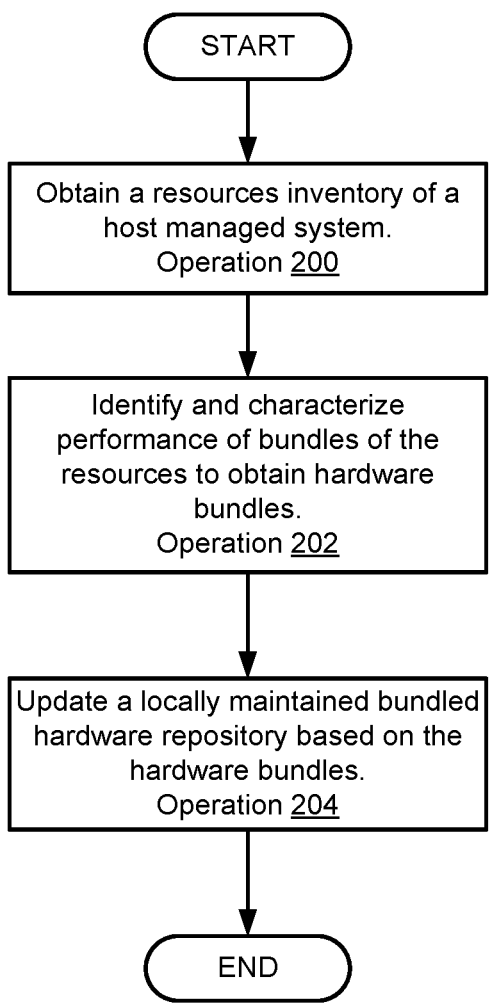
FIGS. 2-3B show flow diagrams illustrating methods in accordance with an embodiment.

As discussed above, the components of FIG. 1A may perform various methods to provide computer implemented services using managed systems that may provide respective solutions limited based on the hardware resources of the respective managed systems. FIGS. 2-3B illustrate examples of methods that may be performed by the components of FIG. 1A. For example, a local subscription manager of a managed system, a deployment manager, and/or a subscription management service may perform all or a portion of the methods. In the diagrams discussed below and shown in FIGS. 2-3B, any of the operations may be repeated, performed in different orders, and/or performed in parallel with or in a partially overlapping in time manner with other operations.

Turning to FIG. 2, a first flow diagram illustrating a method of updating a bundled hardware repository in accordance with an embodiment is shown. The method illustrated in FIG. 2 may be performed by any of the components of the system of FIG. 1A.

At operation 200, a resources inventory for a host managed system is obtained. The resources inventory may be obtained by a local subscription managed hosted by the managed system. The resources inventory may be obtained from a startup manager of the managed system. For example, the startup manager may perform a hardware inventory as part of starting up the host managed system.

In an embodiment, the resources inventory specifies (i) hardware components (all or a portion) of the host managed system, (ii) type information for the specified hardware components, (iii) capability information for the specified hardware components (e.g., how quickly data can be provided to or processed by hardware components), (iv) connectivity information for the hardware components (e.g., which components are connected to other components), and/or (v) other types of information usable to classify or characterize hardware components of a host managed system.

The resources inventory may also include information regarding software components such as, for example, firmware hosted by hardware components, software stacks hosted by a managed system, etc.

In an embodiment, the resources inventory is obtained by sending a request, an interrupt, or other type of communication to the startup manager via an interconnect with which a local subscription manager is operably connected to one or more processors executing instructions (e.g., computer instructions) corresponding to the startup entity. The startup entity may provide the resources inventory and/or information usable by the local subscription manager to obtain the resources inventory. The resources inventory may also be obtained by sending a request to an operation manager which manages various software stacks. The operation manager may provide information regarding these components.

At operation 202, potential hardware bundles may be identified and characterized using the resources inventory. The potential hardware bundles may be identified based on similarities between the hardware components (e.g., specified by the resources inventory), connectivity between the hardware components, management overhead targets, levels of risk presented by bundling different hardware components, regularity of use of different hardware components, and/or other factors.

In an embodiment, the potential hardware bundles are established by identifying similarity in (i) types of the hardware components, (ii) future uses in the hardware components, and/or (iii) expected workloads for the hardware components. For example, bundles of hardware components of similar types may be established to aggregate hardware resources into a bundle. In another example, hardware components that are likely to perform a similar workload may be bundled together (e.g., based on a subscription for a solution that indicates that a set of hardware components will contribute to providing the solution, or a portion of the solution).

For example, to establish a hardware bundle, different hardware components that may cooperate to provide a function of a computer may be identified and grouped. The groups may then be divided and/or limited based on various goals and limitations on group size and/or membership. In the context of storage functionality, hardware components such as controllers, hard disk drives, and solid state drives may be grouped. In the context of processing functionality, hardware components such as processors and graphics processing units may be grouped. In addition to grouping based on primary function, ancillary hardware components such as communication chips that support the primary functions may be added to the groups. Thus, the groups may have a primary function with some hardware components being added to the groups that support these primary functions. The hardware bundles may be established by limiting group membership thereby establishing membership in the hardware bundles.

In an embodiment, the potential hardware bundles are established by limiting membership in a bundle to meet a particular management overhead goal. For example, to facilitate management of indirect management hardware components, the corresponding direct management hardware components may need to perform some amount of work (e.g., screening communications) to limit use of the indirect management hardware components in a bundle. However, if too heavy of a management workload is placed on the direct management hardware component, then it may be unable to provide its other functionalities. To reduce the likelihood of the direct management hardware component being unable to provide its other functionalities, the number of indirect management hardware components in a bundle may be limited based on the capabilities and/or responsibilities of the direct management hardware component(s) in the hardware bundle.

In an embodiment, the potential hardware bundles are established by limiting membership in a hardware bundle to meet interruption level goals. An interruption level goal may be a goal regarding the extent of disruption on operation of a managed system that interruption in the operation of any hardware component may have on its operation. Because the operation of the indirect management hardware components in a bundle may depend on the operation of the direct management hardware component(s) in the hardware bundle, the level of interruption risk presented by the bundle may scale as the bundle size expands. The level of risk may be prevented from exceeding a predetermined interruption level goal by limiting membership in the group.

In an embodiment, the potential hardware bundles are established based on the expected workload levels of different hardware components. For example, the hardware bundles may be established by distributing heavily worked hardware components across different bundles, or aggregating them together in a bundle, depending on the goal for a hardware bundle.

In an embodiment, the potential hardware bundles are established based on a combination of factors (e.g., workload levels, interruption level goals, management overhead goals, etc.). An objective function may be established based on the factors, and a global optimization process may be performed to identify members for a hardware bundle that have a best fitness as defined by the objective function. The objective function may take into account additional factors beyond those noted above.

Once a potential hardware bundle is identified, the potential hardware bundle may be characterized to ascertain its performance levels. For example, the direct management hardware components may be instructed to enforce various limits on their operation (e.g., designed to either reduce performance of the direct or indirect management hardware components of the bundle), and the performance of the hardware bundle under these various limits may be measured by instructing various workloads to be performed and monitoring the performance of the workloads.

At operation 204, a locally maintained bundled hardware repository is updated based on the identified hardware bundles and performance of the hardware bundles. For example, the repository may be updated based on the information obtained in operation 202. Consequently, the capabilities and enforceable limitations on each of the bundles may be identified using the updated bundled hardware repository.

For example, the repository may include entries corresponding to each of the hardware bundles. Each entry may include the capabilities of the bundle under different conditions (e.g., limitation on operation of the direct management hardware components of the bundle).

The method may end following operation 204.

Thus, using the method shown in FIG. 2, hardware bundles of hardware components of managed systems may be established.

Figure 3A:
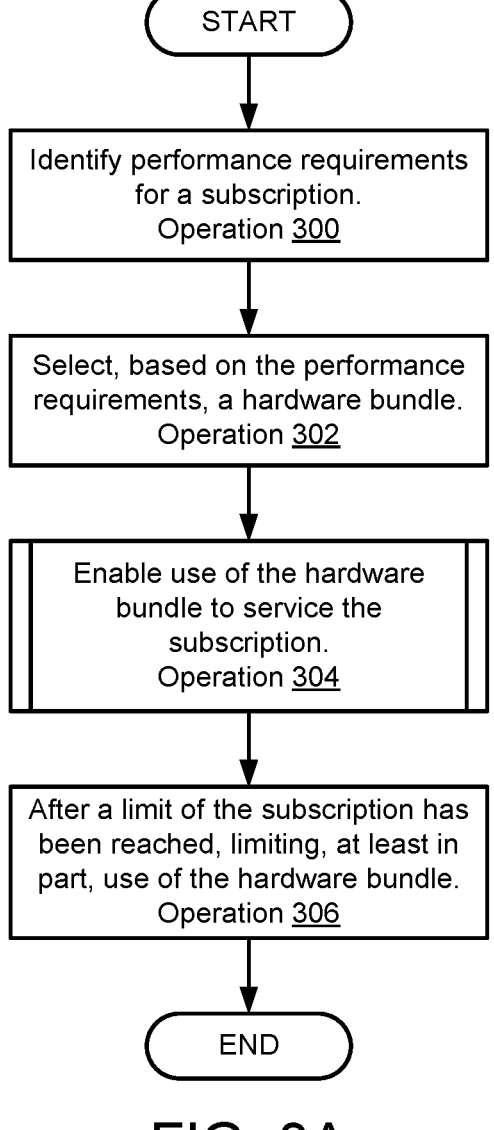
Figure 3B:
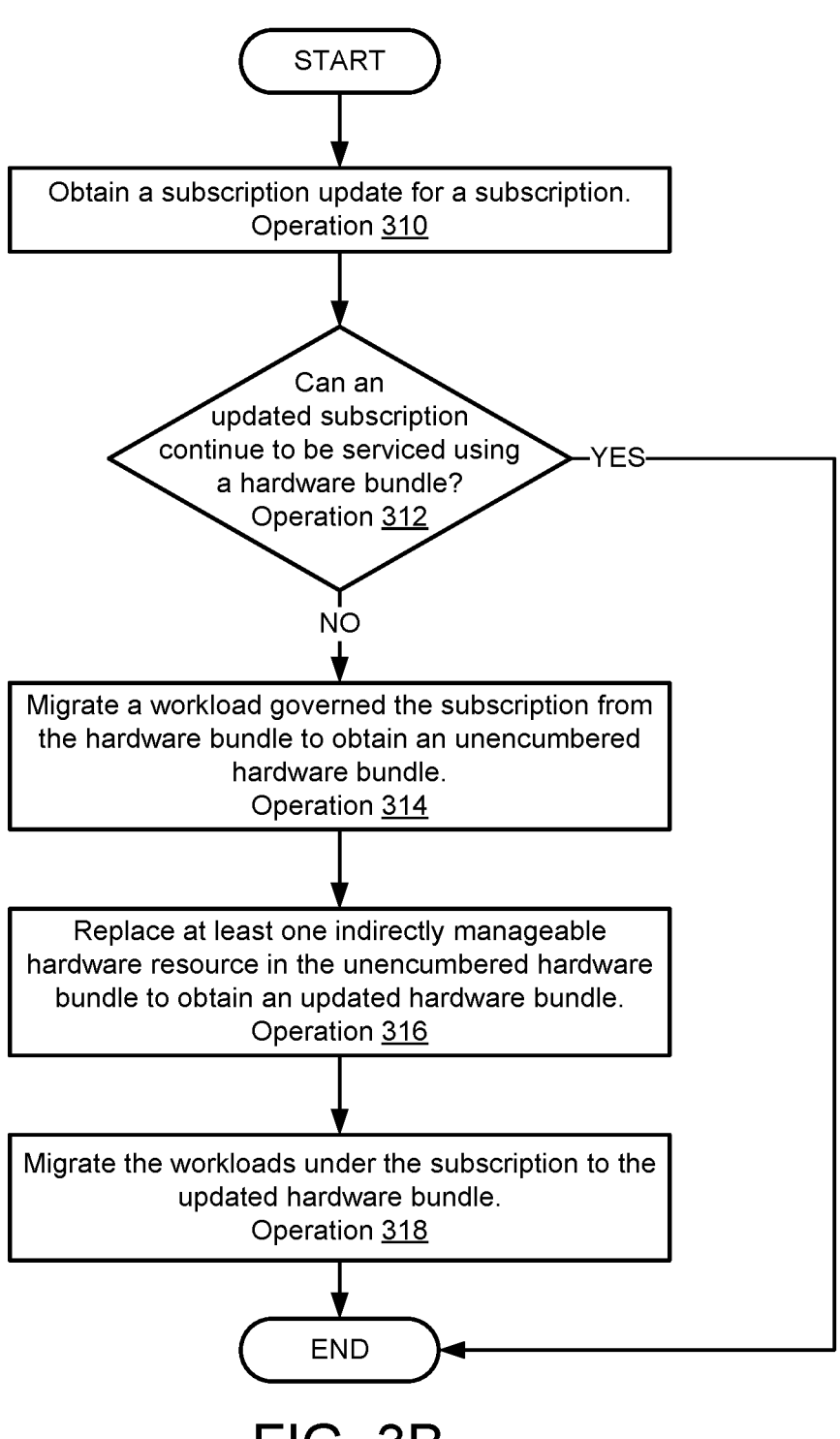

Turning to FIG. 3A, a flow diagram illustrating a method of providing services using managed systems in accordance with an embodiment is shown. The method illustrated in FIG. 3A may be performed by any of the components of the system shown in FIG. 1A.

At operation 300, performance requirements for a subscription may be obtained. The performance requirements may be specified by the subscription. The performance requirements may be obtained by reading the performance requirements from the subscription. The subscription may be obtained from a subscription management system (e.g., via a message sent to a local subscription manager, or via other information distribution frameworks).

At operation 302, a hardware bundle is selected based on the performance requirements. The hardware bundle may be selected by identifying a hardware bundle having performance that meets the performance requirements. The hardware bundle may be identified by comparing the performance requirements to the performance of different hardware bundles specified by the bundled hardware repository, discussed with respect to FIG. 2.

At operation 304, use of the hardware bundle is enabled to service the subscription. Use of the hardware bundle may be enabled by instructing one or more direct management hardware components of the hardware bundle to update their operation. The updated operation may, for example, reduce (and/or increase) artificially imposed limits on use of indirect management hardware components of the selected hardware bundle.

Additionally, workload monitors may be established and used to monitor use of the hardware bundle in servicing the subscription. The monitored use may be used to take proactive action to avoid subscription limits from being reached. Refer to FIGS. 4A-4D for additional details regarding proactive action that may be taken to avoid reaching subscription limits.

Additionally, while a hardware bundle is enabled, changes to the subscription may be made. Refer to FIG. 3B for additional details regarding managing changes to subscriptions while hardware bundles are enabled.

At operation 306, after a limit on the subscription is reached, use of the hardware bundle may be limited. The use of the hardware bundle may be limited by instructing the one or more direct management hardware components of the hardware bundle to update their operation a second time. The second updated operation may (i) directly reduce the ability of functions of the direct management hardware components to be used, and (ii) may, for example, increase artificially imposed limits on use of indirect management hardware components of the selected hardware bundle.

The number and extent of changes in the artificially imposed limits may be based on the remaining subscriptions. For example, when a subscription limit is reached, other subscriptions may still grant some use of the hardware bundle. Thus, the limits imposed when a subscription limit is reached may be proportional to the loss of rights to use of the hardware bundle.

To select how to impose the limits, the bundled hardware repository may be queried to identify how changes in operation of the direct management hardware components will change performance of the hardware bundle.

The method may end following operation 306.

Turning to FIG. 3B, a flow diagram illustrating a method of enabling bundles for use in accordance with an embodiment is shown. The method illustrated in FIG. 3B may be performed by any of the components of the system shown in FIG. 1A.

Figure 5A:
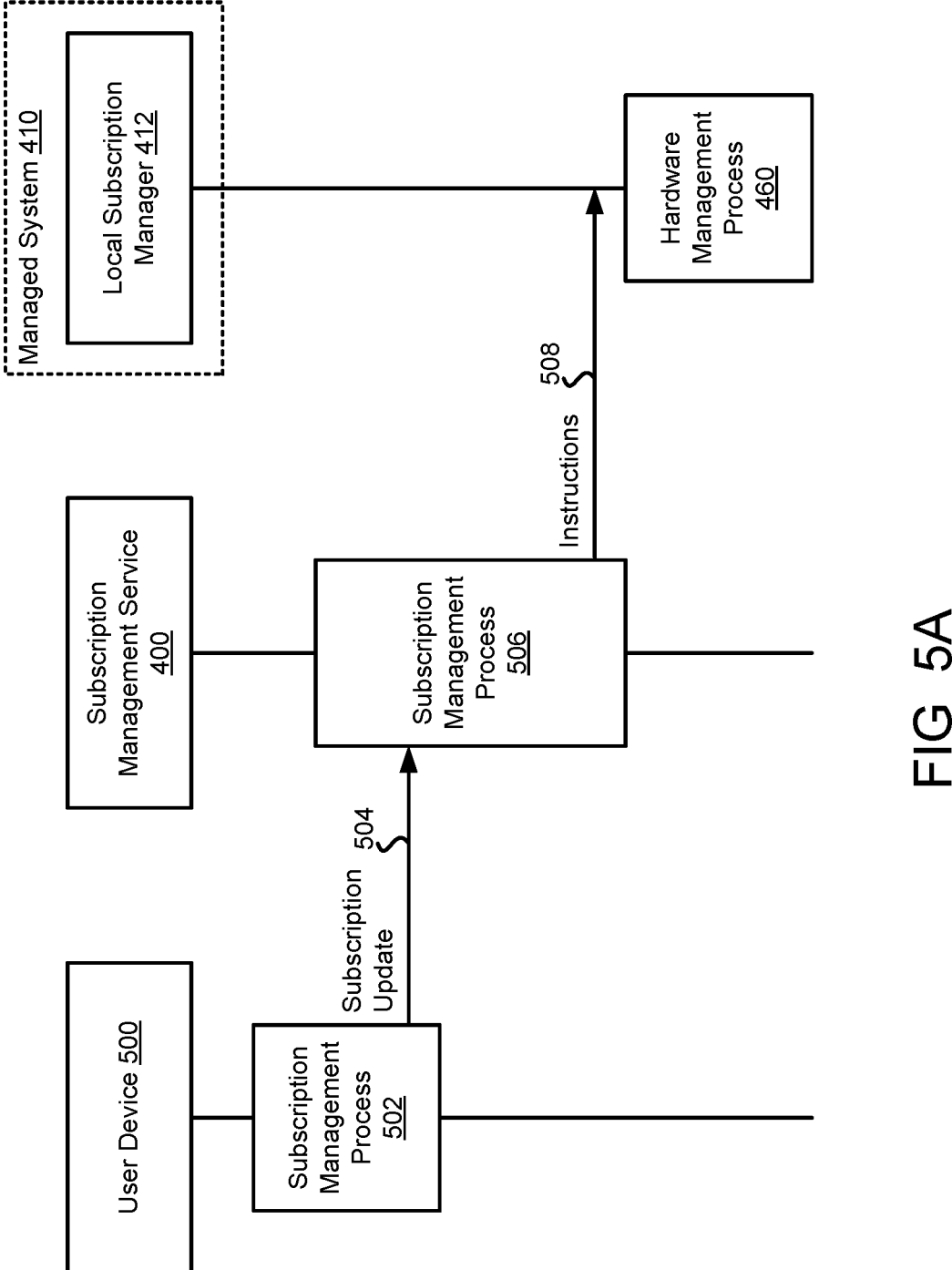

At operation 310, a subscription update for a subscription update is obtained. The subscription update may be obtained by receiving it from a subscription management system. The subscription management system may receive it from a user device. The user device may be used by a user and may provide user input via the user input device to indicate the changes to the subscription. Refer to FIG. 5A for additional details regarding obtaining subscription updates.

At operation 312, a determination may be made regarding whether an updated subscription based on the subscription update is serviceable using a hardware bundle used, in part, to service the subscription prior to update. The determination may be made by comparing a change in capacity or other metric specified by the subscription update to the capacity of the hardware bundle for participate in services governed by the subscription. If the changed capacity or other metric exceeds the capacity (or similar metric) of the hardware bundle, then it may be determined that the updated subscription is not serviceable by the hardware bundle.

If the subscription is not serviceable by the hardware bundle, then the method may proceed to operation 314. Otherwise, the method may end following operation 312 (e.g., the hardware bundle may continue to support service governed by the subscription after the update).

Figure 5B:
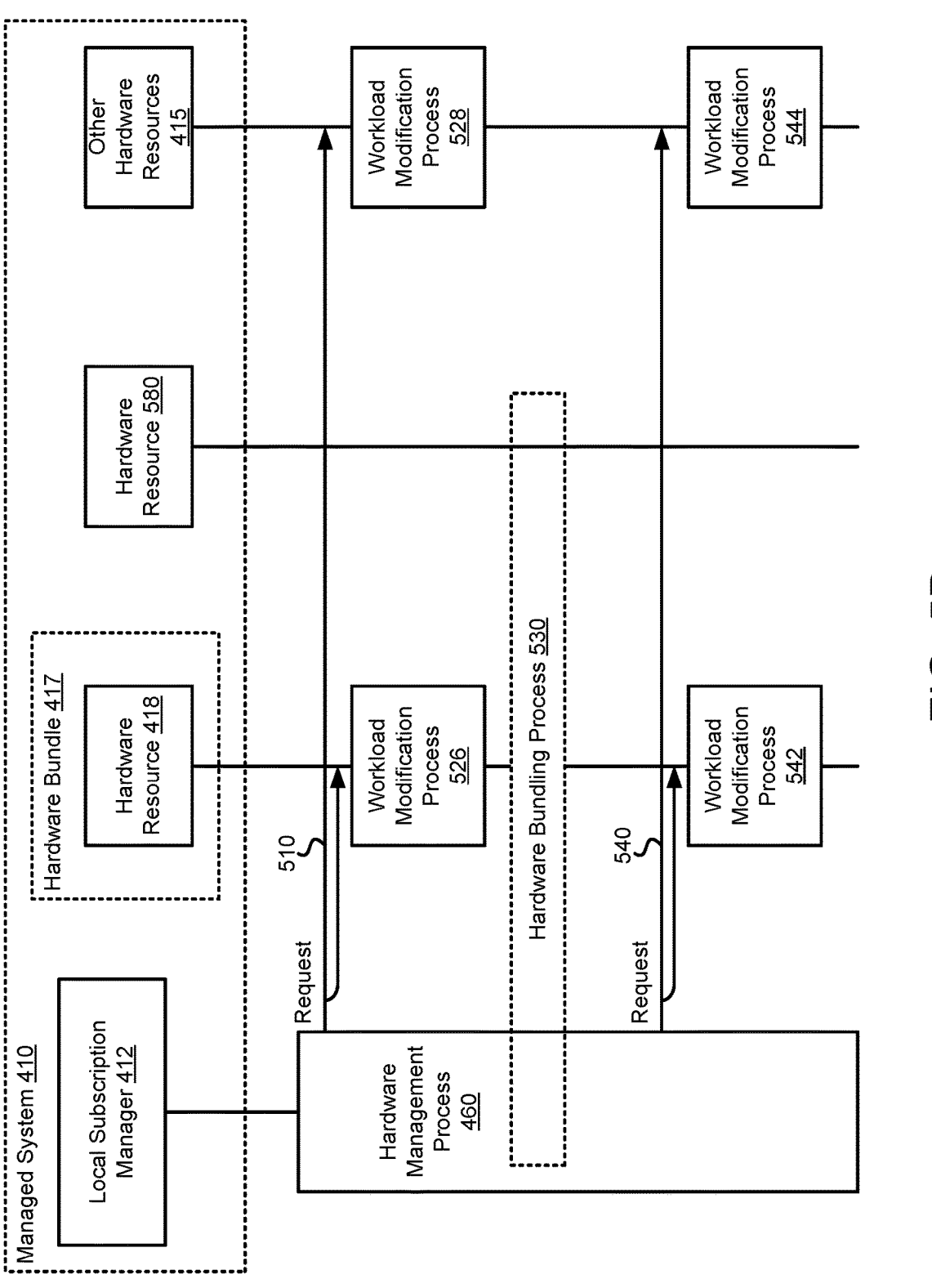

At operation 314, a workload governed by the subscription is migrated from the hardware bundle to obtain an unencumbered hardware bundle. The workload may be migrated by (i) instructing hardware resources, and/or entities hosted thereby, to reduce usage of the hardware bundle for workloads governed by the subscription, (ii) instructing the hardware bundle to misreport its available capacity to hardware resources that support workloads governed by the subscription to cause the hardware resources to believe that the hardware bundle has a lower level of capacity for supporting workloads governed by the subscription than the hardware bundle actually has capacity to support (e.g., which may cause the entities hosted by the hardware resources to migrate the workload), and/or via other processes. Refer to FIG. 5B for additional details regarding migrating workloads governed by the subscription.

At operation 316, at least one indirectly management hardware resource of the unencumbered hardware bundle is replaced to obtain an updated hardware bundle. The at least one indirectly management hardware resource may be replaced by (i) identifying an unallocated indirectly management hardware resource (e.g., not a member of any hardware bundle) that if added to the hardware bundle will likely increase the capacity of the hardware bundle above that necessary to support services governed by the subscription after the update, and (ii) adding the identified unallocated indirectly management hardware resource to the bundle. Refer to FIG. 4B for additional details regarding establishing and/or updated hardware bundles through adding of unallocated indirectly management hardware resources.

At operation 318, the workloads under the subscription may be migrated to the updated hardware bundle. The workloads under the subscription may be migrated by reverting the changes made in operation 314, in similar manners to how the changes were made.

The method may end following operation 318.

Thus, via the methods illustrated in FIGS. 2-3B, changes to subscriptions may be made with reduced levels of impact on services governed by the subscriptions.

Turning to FIGS. 4A-5B, interaction diagrams in accordance with an embodiment are shown. In these figures, a system similar to that illustrated in FIG. 1A may be operating. In these figures, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

Figure 4A:
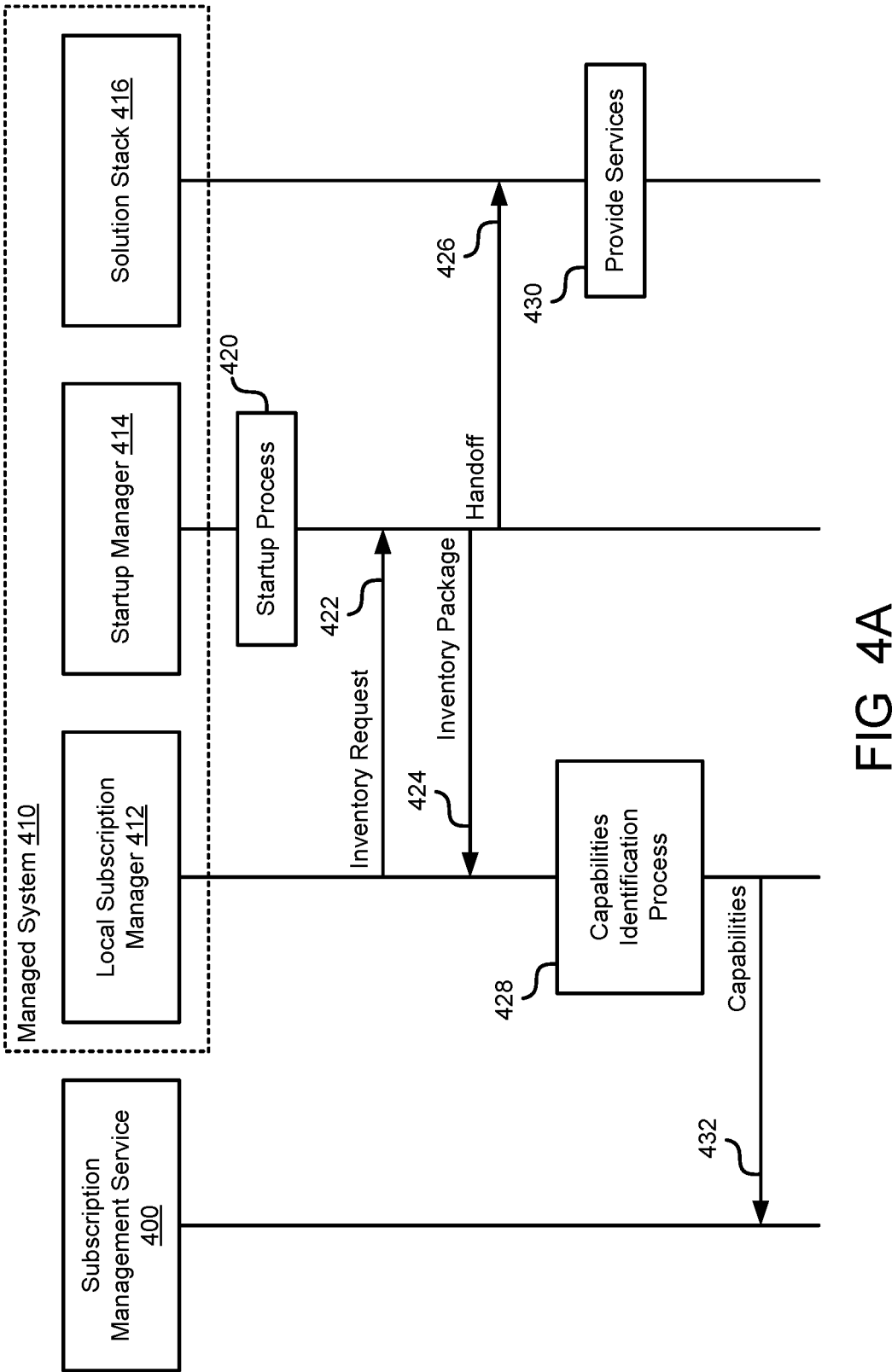
FIGS. 4A-5B show diagrams illustrating interactions between and actions of components of a system in accordance with an embodiment.
Figure 4B:
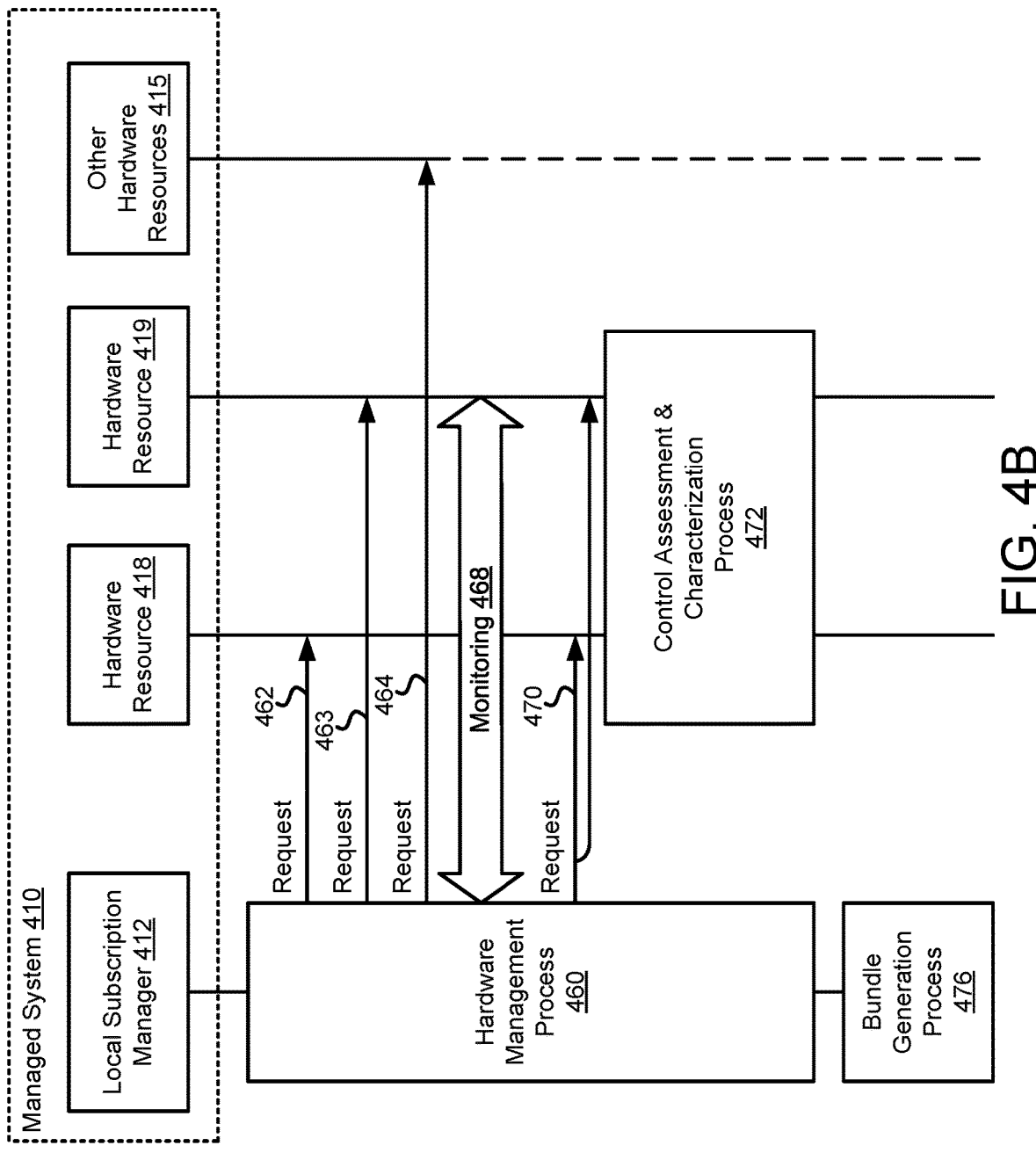

Turning to FIG. 4A, consider a scenario where managed system 410 begins, at block 420, to perform a startup. The startup may be performed to place managed system 410 in a predetermined operating state. Subscription management service 400 may manage managed system 410 such that it enters the predetermined operating state in which it is likely to be able to provide desired computer implemented services with solution stack 416.

At block 422, local subscription manager hosted by managed system 410 identifies the startup and sends an inventory request to startup manager 414. As part of the startup, startup manager 414 may perform a resource inventory of managed system 410 through which it may identify the available (e.g., enabled) hardware components of managed system 410.

At block 424, in response to the request, startup manager 414 provide an inventory package to local subscription manager 412. The inventory package may include information regarding the hardware components of managed system 410.

Using the inventory data package, at block 428, local subscription manager performs a capabilities identification process for managed system 410 to identify the capabilities of managed system 410. Local subscription manager 412 may locally record the capabilities and, at block 432, notify subscription management service 400 regarding the capabilities.

While, before, or after any of blocks 424, 428, and 432 are performed, at block 426, startup manager 414 may complete the startup and perform a handoff of operational management of managed system 410 such that the operation manager and/or applications of solution stack 416 begin operation. Startup manager 414 may suspend or terminate its operation after the handoff.

At block 430, solution stack 416 begins to provide services, which may be computer implemented services provided to users of and/or devices operably connected to managed system 410.

However, to provide the services, hardware supporting solution stack 416 may need to be provisioned ahead of and/or as part of operation of solution stack 416. To select which hardware to provision, the capabilities of the hardware may need to be known.

Turning to FIG. 4B, consider a scenario where managed system 410 may perform hardware management process 460. During hardware management process 460, local subscription manager 412 may establish and characterize various hardware bundles.

To do so, at blocks, 462-463, request for information regarding hardware resources 418-419 may be made to obtain information regarding these hardware resources. In this example, the hardware resources may be usable to establish a hardware bundle. For example, hardware resource 418 may be a storage controller and hardware resource 419 may be a storage device.

To ascertain the performance level of the potential hardware bundle, at block 464, a request may be sent to other hardware resources 415. The request may, as discussed with respect to FIGS. 1E-1F, cause hardware resources 418-419 to be isolated through a variety of different mechanisms (e.g., communication isolation, depowering, etc.). Thus, following receipt of the request, other hardware resources 415 may begin to have a reduced level of influence on hardware resources 418-419 (in FIG. 4B, this is shown by drawing the line past the arrow of block 464 in dashing).

Once isolated, at blocks 468 and 474, monitoring of operation of hardware resources 418-419 may be initiated and a request may be sent to hardware resource 418 and/or 419. The request may cause the hardware resources to begin to perform various workload tests and test the level of control hardware resource 418 has over hardware resource 419. For example, to test the level of control, various limitations on the operation of hardware resource 418 may be implemented to identify how the limitations impact the operation of hardware resource 419. Similarly, various workload tests may be performed and monitored to estimate the performance level of the potential hardware block for various types of workloads.

Once the resulting control assessment and characterization process 472 is completed (e.g., the workload tests and control assessments), bundle generation process 476 may be performed. During bundle generation process, an entry may be generated in a hardware bundle repository. The entry may, as discussed above, may include the corresponding workload test results (e.g., estimated performance), confidence levels in the estimated performance levels for different types of workloads, levels of control over the hardware bundle, etc.

Thus, once established, the entry may be used to select the hardware bundle (e.g., 417, shown in FIG. 4C) for servicing a subscription.

Similar processes to those shown in FIG. 4B may be performed when a hardware resource from a hardware bundle is replaced. For example, similar assessment processes may be performed to determine whether an addition/replacement of a hardware component may be sufficient to meet requirements of subscriptions.

Figure 4C:
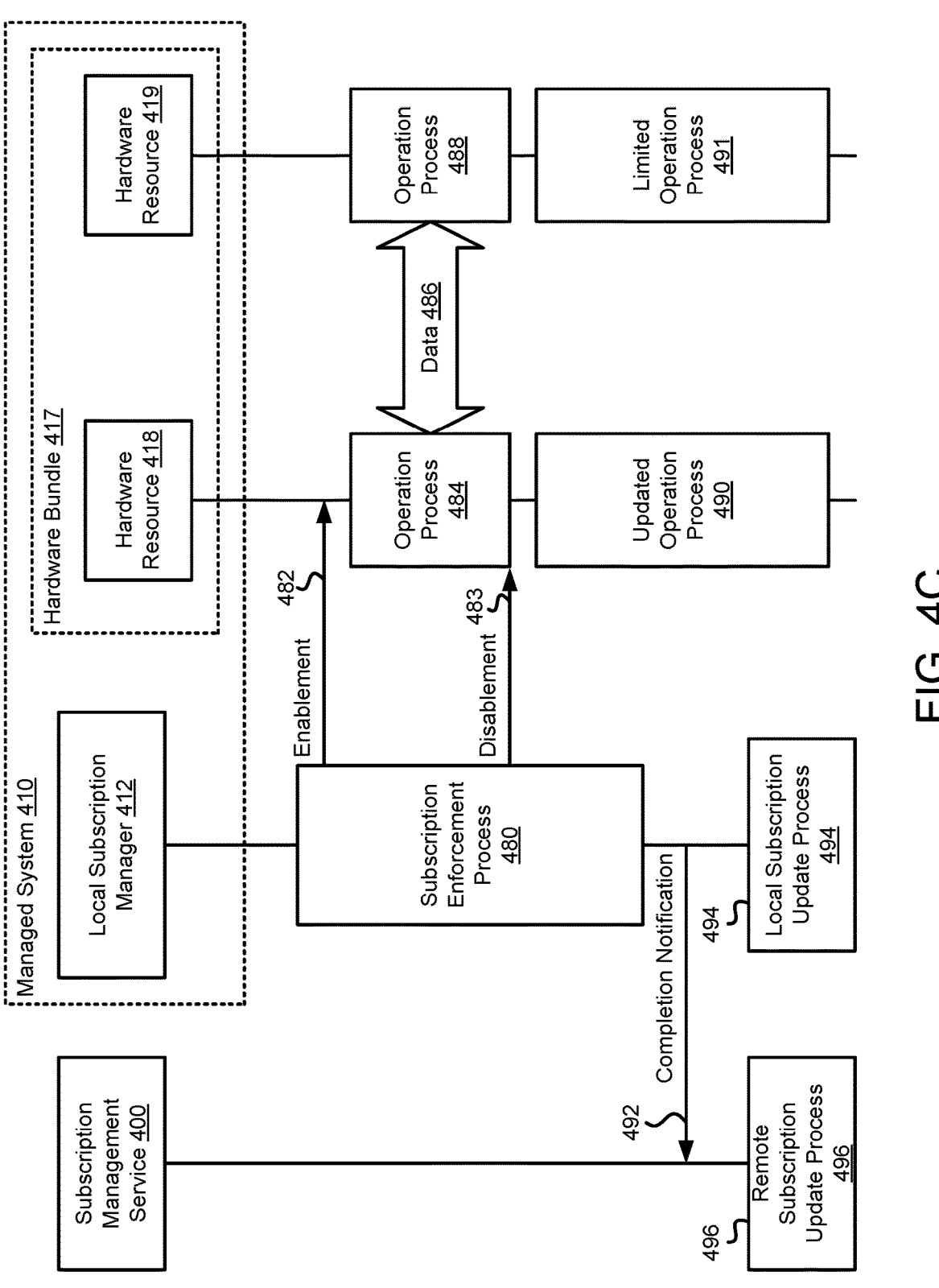

Turning to FIG. 4C, now consider a scenario where, to implement the solution stack, local subscription manager 412 is tasked with selecting and dedicating hardware for use to satisfy a subscription for the solution stack.

To satisfy the subscription, subscription enforcement process 480 may be performed. During subscription enforcement process, hardware bundle 417 (e.g., established via the interactions shown in FIG. 4B) may be selected for use in satisfying the subscription because it has a level of performance sufficient to meet the requirements of the subscription.

Once selected, to enable use of the hardware bundle 419, at block 482, an enablement request may be sent to hardware resource 418. The enablement request may request that hardware resource 418 update its operation to enable use of both hardware resources 418-419.

In response to the enablement request, hardware resource 418 may update its operation thereby causing it to perform operation process 484. During operation process 484, limits on transmission of data from hardware resource 418 to hardware resource 419 may be removed and/or other modifications in operation may be made to enable hardware bundle 417 to provide levels of performance commensurate with expectations set under subscriptions. Thus, data 486, previously screened from hardware resource 419, may flow freely between the hardware resources (e.g., at least within limits imposed to manage performance of hardware bundles to match that to which users subscribe). Consequently, hardware resource 419 may perform operation process 488 may by virtue of the flow of data. Accordingly, while operation process 484 and operation process 488 are performed, users of managed system 410 may utilize these hardware resources thereby allowing the solution stack to execute without limitation.

Figure 4D:
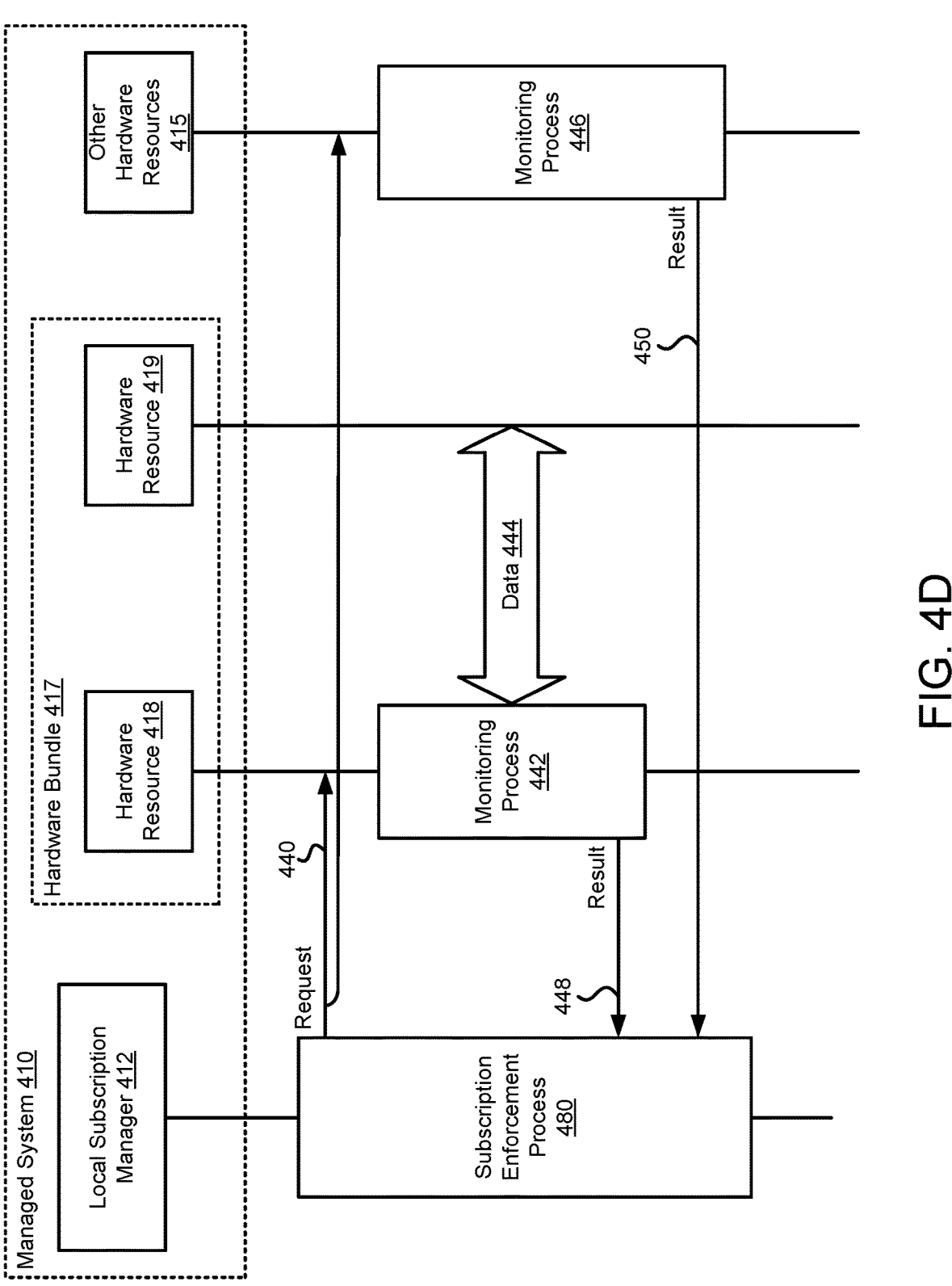

However, subscription enforcement process 480 may also keep track of limits on subscriptions. The limits may be time based, usage base, or may be based on other types of criteria. Consequently, once a limit on the subscription is reached, subscription enforcement process 480 may, at block 483, automatically send a request to hardware 418 that causes use of hardware resource 419 to be limited or prevented. Refer to FIG. 4D for additional details regarding identifying when subscription limits are reached.

While services are provided using hardware bundle 417, subscriptions may be updated over time. Refer to FIGS. 5A-5B for additional details regarding management of hardware bundles when subscriptions are modified.

If subscription limits are reached, when the disablement request at block 483 is received by hardware resource 418, hardware resource 418 may again update its operation to start performing updated operation process 490. During updated operation process 490, data may be screened from hardware resource 419 (and/or other actions may be taken to reduce the use of hardware bundle 417 in services governed by a subscription) thereby depriving users of managed system 410 from use of at least some of the functionality of hardware resource 419.

Consequently, while data 486 is screened from hardware resource 419, hardware resource may enter into a limited operation process 491, where its functionality may be artificially limited by operation updated operation process 490 performed by hardware resource 418.

After completion of the subscription enforcement, at block 492, local subscription manager 412 may send a completion notification to subscription management service 400. In response, subscription management service 400 may perform remote subscription update process 496 to track that the subscription limit on the subscription has been enforced by managed system.

Local subscription manager 412 may also perform a local subscription update process 494 for the subscription to record the fact that the limit has been reached and that the limit is being enforced.

Turning to FIG. 4D, returning to the discussion of operation of hardware bundle 417 after the enablement at block 482 is performed, as part of the enablement process subscription enforcement process 480 may send, at block 440, a request to hardware resource 418 and other hardware resources 415 (e.g., other hardware resources not selected to be part of hardware bundle 417, but that are used to service the subscription for which the enablement is performed).

The request may be to instantiate workload monitors in each of these components to identify workloads performed by hardware bundle 417 and other hardware resources 415 to service the subscription. In response, the workload monitors instantiated based on the requests may initiate performance of monitoring processes 442, 446. As previously discussed, through these monitoring processes information usable to identify the workloads performed by hardware bundle 417 to service the subscriptions may be identified.

To facilitate identification of these workloads, the monitoring processes may return results to local subscription manager 412 at blocks 448 and 450. These results may be used to discriminate workloads performed by hardware bundle 417 to service the subscription from other workloads performed by hardware bundle 417.

Through this analysis, subscription enforcement process 480 may identify when a subscription limit is likely to be reached been reached. For example, a predictive model (e.g., regression) may be used to ascertain a future point in time when a subscription limit will likely be reached.

Returning to the discussion of FIG. 4C, the disablement at block 483 may be performed when the subscription limit is reached.

However, while the hardware bundle is used to provide services governed by a subscription, terms of the subscriptions (e.g., capacity, usage limits, etc.) may change.

Turning to FIG. 5A, to change the terms of a subscription, a user having authority to change the terms of a subscription may use user device 500 to perform subscription management process 502. During subscription management process, the user may utilize a user interface to select and confirm changes to the terms of a subscription. The changes to the terms of the subscription may be packaged as a subscription update and may, at block 504, be provided to subscription management service 400.

When received and as part of subscription management process 506, subscription management service 506 may confirm and update the information that it maintains regarding the subscribed to solutions, services, etc. based on the subscription update. Using the updated information, instructions may be sent to local subscription manager 412 at block 508. The instructions may specify changes to, for example, an intermediate representation used to implement a subscription, information regarding changes in the terms of the subscription, and/or other types of information regarding the now updated subscription.

When the instructions are received, local subscription manager 412 may perform hardware management process 460 (e.g., a same or similar process to that described with respect to FIG. 4B).

Turning to FIG. 5A, based on the extent of the changes to the subscription, local subscription manager 412 may initiate changes to hardware bundle 417 (in FIG. 5A, hardware resource 419 is omitted from the drawing due to space constraints, but it will be appreciated that it may be a part of hardware bundle 417). For example, at block 510, requests to hardware resources 418 and/or other hardware resources 415 may be sent to reduce the use of hardware bundle 417. The requests may include instructions that reduce the use of hardware bundle 417 in services governed by a subscription, as described with respect to FIG. 1G.

For example, based on the requests, hardware resource 418 may perform workload modification process 526 through which it misreports the capacity of hardware bundle 417 to other hardware resources 415 thereby causing other hardware resources 415 to preferentially utilize other hardware resources for performing workloads.

In another example, based on the requests, other hardware resources 415 may perform workload modification process 528 through which it actively reduces use of hardware bundle 417 in the workloads that other hardware resources 415 performs (e.g., the instructions may cause applications or other entities hosted by other hardware resources 415 and that utilize hardware bundle 417 to reduce use of hardware bundle 418 in performance of workloads).

Once workload modification processes 526-528 are complete, hardware bundle process 530 may be performed. Refer to FIG. 4D for additional details regarding hardware bundling process (e.g., may include any of the actions shown in FIG. 4D). Hardware management process may cause hardware resource 580 to be selected for and added to hardware bundle 417. For example, if hardware resource 419 lacked sufficient capacity to support services governed by the updated subscription, and hardware resource 580 provided similar functionality and had sufficient capacity to support the services, then hardware resource 580 may be selected and added to hardware bundle 417.

Once hardware bundling process 530 is complete, local subscription manager 412 may revert the changes caused by the requests at block 510. For example, at block 540, additional requests may be sent out to hardware bundle 417 and/or other hardware resources 415. These requests may cause the workloads governed by the subscription to be migrated back to hardware bundle 417.

Consequently, hardware resource 418 may perform workload modification process 542 thereby causing it to properly report its capacity for participation in workloads to other hardware resources 415. Further, other hardware resources 415 may perform workload modification process 544 to cause applications and/or other hosted entities to offload workloads governed by the subscription to hardware bundle 417.

Thus, via the processes illustrated in FIGS. 4A-5B, embodiments disclosed herein may provide for the automated and distributed configuration of various managed systems in a distributed system. By doing so, the cognitive burden on users and managers of managed systems may be reduced.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of managed systems if the control layer for the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control plane used to manage the configuration of the distributed system may be far more resilient to malicious attacks.

Accordingly, embodiments disclosed herein may be provide for the improved operation of distributed system by improving resilience to malware or other types of third party attacks while still providing for configurability over time such that various types of desired solutions may be provided over time.

As discussed above, various components may be implemented with computing devices. For example, any of the components illustrated in FIGS. 1A-5B may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims.

The specification and drawings are, accordingly, to be regarded in an illustrative sense rather than a restrictive sense.

What is claimed is:

1. A method for managing computer implemented services provided by a managed system, the method comprising:

enabling, by a local subscription manager, use of a hardware bundle to service a subscription;

while the hardware bundle is enabled for use and by the local subscription manager:

obtaining a subscription update for the subscription;

making a determination regarding whether an updated subscription based on the subscription update is serviceable using the hardware bundle;

in an instance of the determination where the updated subscription is not serviceable using the hardware bundle:

migrating a workload governed by the subscription from the hardware bundle to obtain an unencumbered hardware bundle;

replacing at least one indirectly manageable hardware resource in the unencumbered hardware bundle to obtain an updated hardware bundle; and migrating the workload to the updated hardware bundle.

2. The method of claim 1, wherein making the determination comprises:

estimating a capacity of the hardware bundle; and comparing the capacity to a capacity requirement of the updated subscription.

3. The method of claim 1, wherein migrating the workload governed by the subscription comprises:

instructing a hardware resource that supports the workload and is not a member of the hardware bundle to reduce use of the hardware bundle.

4. The method of claim 1, wherein migrating the workload governed by the subscription comprises:

instructing a directly manageable hardware resource of the hardware bundle to misreport workload handling capacity to a hardware resource that supports the workload and is not a member of the hardware bundle to reduce use of the hardware bundle.

5. The method of claim 4, wherein the misreporting of the workload handling capacity indicates that the hardware bundle has a lower level of capacity for supporting the workload than an actual level of capacity for supporting the workload of the hardware bundle.

6. The method of claim 1, wherein replacing the at least one indirectly manageable hardware resource comprises:

identifying an unallocated indirectly manageable hardware resource that is manageable by a directly manageable hardware resource of the unencumbered hardware bundle and based, at least in part, the updated subscription; and bundling the unallocated indirectly manageable hardware resource in the unencumbered hardware bundle.

7. The method of claim 1, wherein an indirectly manageable hardware resource of the hardware bundle is unmanageable by the local subscription manager, and a directly manageable hardware resource is manageable by the local subscription manager.

8. The method of claim 7, wherein the directly manageable hardware resource is upstream of communications of the indirectly manageable hardware resource, and is adapted to at least partially selectively screen the communications from the indirectly manageable hardware resource to manage functionality of the indirectly manageable hardware resource.

9. A non-transitory machine-readable medium having instructions stored therein, which when executed by a processor, cause the processor to perform operations for managing computer implemented services provided by a managed system, the operations comprising:

enabling, by a local subscription manager, use of a hardware bundle to service a subscription;

while the hardware bundle is enabled for use and by the local subscription manager:

obtaining a subscription update for the subscription;

making a determination regarding whether an updated subscription based on the subscription update is serviceable using the hardware bundle;

in an instance of the determination where the updated subscription is not serviceable using the hardware bundle:

migrating a workload governed by the subscription from the hardware bundle to obtain an unencumbered hardware bundle;

replacing at least one indirectly manageable hardware resource in the unencumbered hardware bundle to obtain an updated hardware bundle; and migrating the workload to the updated hardware bundle.

10. The non-transitory machine-readable medium of claim 9, wherein making the determination comprises:

estimating a capacity of the hardware bundle; and comparing the capacity to a capacity requirement of the updated subscription.

11. The non-transitory machine-readable medium of claim 9, wherein migrating the workload governed by the subscription comprises:

instructing a hardware resource that supports the workload and is not a member of the hardware bundle to reduce use of the hardware bundle.

12. The non-transitory machine-readable medium of claim 9, wherein migrating the workload governed by the subscription comprises:

instructing a directly manageable hardware resource of the hardware bundle to misreport workload handling capacity to a hardware resource that supports the workload and is not a member of the hardware bundle to reduce use of the hardware bundle.

13. The non-transitory machine-readable medium of claim 12, wherein the misreporting of the workload handling capacity indicates that the hardware bundle has a lower level of capacity for supporting the workload than an actual level of capacity for supporting the workload of the hardware bundle.

14. The non-transitory machine-readable medium of claim 9, wherein replacing the at least one indirectly manageable hardware resource comprises:

identifying an unallocated indirectly manageable hardware resource that is manageable by a directly manageable hardware resource of the unencumbered hardware bundle and based, at least in part, the updated subscription; and bundling the unallocated indirectly manageable hardware resource in the unencumbered hardware bundle.

15. The non-transitory machine-readable medium of claim 9, wherein an indirectly manageable hardware resource of the hardware bundle is unmanageable by the local subscription manager, and a directly manageable hardware resource of the hardware bundle is manageable by the local subscription manager.

16. The non-transitory machine-readable medium of claim 15, wherein the directly manageable hardware resource is upstream of communications of the indirectly manageable hardware resource, and is adapted to at least partially selectively screen the communications from the indirectly manageable hardware resource to manage functionality of the indirectly manageable hardware resource.

17. A managed system, comprising:
directly manageable hardware resources;
indirectly manageable hardware resources;
a processor; and
a local subscription manager adapted to perform operations for managing computer implemented services provided by the managed system, the operations comprising:
    enabling use of a hardware bundle to service a subscription;
    while the hardware bundle is enabled for use:
        obtaining a subscription update for the subscription;
        making a determination regarding whether an updated subscription based on the subscription update is serviceable using the hardware bundle;
        in an instance of the determination where the updated subscription is not serviceable using the hardware bundle:

migrating a workload governed by the subscription from the hardware bundle to obtain an unencumbered hardware bundle;
        replacing at least one indirectly manageable hardware resource in the unencumbered hardware bundle to obtain an updated hardware bundle; and
        migrating the workload to the updated hardware bundle.

18. The managed system of claim 17, wherein making the determination comprises:
    estimating a capacity of the hardware bundle; and
    comparing the capacity to a capacity requirement of the updated subscription.

19. The managed system of claim 17, wherein migrating the workload governed by the subscription comprises:
    instructing a hardware resource that supports the workload and is not a member of the hardware bundle to reduce use of the hardware bundle.

20. The managed system of claim 17, wherein migrating the workload governed by the subscription comprises:
    instructing a directly manageable hardware resource of the hardware bundle to misreport workload handling capacity to a hardware resource that supports the workload and is not a member of the hardware bundle to reduce use of the hardware bundle.

\* \* \* \* \*